(12) United States Patent
Son et al.

(10) Patent No.: US 11,777,693 B2
(45) Date of Patent: Oct. 3, 2023

(54) SIGNALING METHOD FOR MULTI-USER TRANSMISSION, AND WIRELESS COMMUNICATION TERMINAL AND WIRELESS COMMUNICATION METHOD USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/482,420

(22) Filed: Sep. 23, 2021

(65) Prior Publication Data
US 2022/0014339 A1  Jan. 13, 2022

Related U.S. Application Data

(63) Continuation of application No. 16/520,313, filed on Jul. 23, 2019, now Pat. No. 11,153,058, which is a
(Continued)

(30) Foreign Application Priority Data

Feb. 17, 2015 (KR) .................. 10-2015-0024516
May 9, 2015 (KR) .................. 10-2015-0064992

(51) Int. Cl.
*H04L 5/00* (2006.01)
*H04W 74/08* (2009.01)

(52) U.S. Cl.
CPC ............ *H04L 5/0092* (2013.01); *H04L 5/001* (2013.01); *H04L 5/003* (2013.01); *H04L 5/0053* (2013.01); *H04W 74/085* (2013.01)

(58) Field of Classification Search
CPC .......... H04W 74/085; H04W 72/0453; H04W 72/0406; H04L 5/0092; H04L 5/0053;
(Continued)

(56) References Cited

U.S. PATENT DOCUMENTS 10,411,870 B2 * 9/2019 Son .................. H04L 5/0053
11,153,058 B2 * 10/2021 Son .................. H04W 74/085
(Continued)

FOREIGN PATENT DOCUMENTS

CN          101675601          3/2010
CN          102013959          4/2011
(Continued)

OTHER PUBLICATIONS

Office Action dated Nov. 10, 2021 for Korean Patent Application No. 10-2021-7027207 and its English translation provided by Applicant's foreign counsel.
(Continued)

*Primary Examiner* — Benjamin H Elliott, IV
(74) *Attorney, Agent, or Firm* — Ladas & Parry, LLP

(57) ABSTRACT

The present invention relates to a signaling method of a wireless LAN frame for multi-user transmission, and to a wireless communication terminal, and a wireless communication method using the same.
To this end, provided are a wireless communication terminal, including: a transceiver; and a processor, wherein the processor is configured to: generate a frame including a first signal field and a second signal field, wherein the first signal field includes a bandwidth field indicating total bandwidth information in which the frame is transmitted, and the
(Continued)

second signal field includes a resource allocation field indicating arrangement information of resource unit(s) in a frequency band through which the frame is transmitted, and transmit, by the transceiver, the generated frame and a wireless communication method using the same.

20 Claims, 25 Drawing Sheets

Related U.S. Application Data continuation of application No. 15/678,053, filed on Aug. 15, 2017, now Pat. No. 10,411,870, which is a continuation of application No. PCT/KR2016/001627, filed on Feb. 17, 2016.

(58) Field of Classification Search
CPC ....... H04L 5/001; H04L 5/003; H04L 5/0094; H04L 27/2601; H04L 5/0007; H04L 5/0091; H04B 7/0413; H04B 7/0452
See application file for complete search history.

(56) References Cited

U.S. PATENT DOCUMENTS

| | | | | |
|---|---|---|---|---|
| 2011/0188592 | A1* | 8/2011 | Sandhu | H04L 27/2613 375/260 |
| 2012/0327871 | A1 | 12/2012 | Ghosh et al. | |
| 2013/0070642 | A1* | 3/2013 | Kim | H04W 52/0219 370/254 |
| 2013/0128828 | A1* | 5/2013 | Baldemair | H04W 72/04 370/329 |
| 2013/0286959 | A1 | 10/2013 | Lou et al. | |
| 2014/0079003 | A1* | 3/2014 | Noh | H04W 72/04 370/329 |
| 2014/0211775 | A1 | 7/2014 | Sampath et al. | |
| 2014/0241458 | A1* | 8/2014 | Zhang | H04L 25/0226 375/295 |
| 2014/0307649 | A1 | 10/2014 | Vermani et al. | |
| 2014/0348097 | A1 | 11/2014 | Park et al. | |
| 2015/0009894 | A1 | 1/2015 | Vermani et al. | |
| 2015/0023335 | A1 | 1/2015 | Vermani et al. | |
| 2015/0085802 | A1* | 3/2015 | Papasakellariou | H04L 5/0055 370/329 |
| 2015/0124745 | A1* | 5/2015 | Tandra | H04L 5/0023 370/329 |
| 2015/0163028 | A1* | 6/2015 | Tandra | H04L 5/0028 370/203 |
| 2015/0163043 | A1* | 6/2015 | Lee | H04L 5/0073 370/336 |
| 2016/0073387 | A1* | 3/2016 | Yang | H04L 5/0039 370/329 |
| 2016/0081087 | A1* | 3/2016 | Kwon | H04L 5/0094 370/329 |
| 2016/0150514 | A1* | 5/2016 | Kwon | H04W 74/0816 370/329 |
| 2016/0192351 | A1* | 6/2016 | Kwon | H04W 72/21 370/329 |
| 2016/0285526 | A1* | 9/2016 | Hedayat | H04L 5/0094 |
| 2016/0295587 | A1* | 10/2016 | Kwon | H04L 5/0094 |
| 2016/0330300 | A1* | 11/2016 | Josiam | H04L 5/0044 |
| 2016/0381664 | A1* | 12/2016 | Ghosh | H04L 69/22 370/329 |
| 2017/0070998 | A1* | 3/2017 | Wu | H04W 72/0453 |
| 2017/0127269 | A1* | 5/2017 | Ryu | H04W 72/00 |
| 2017/0359159 | A1* | 12/2017 | Kim | H04L 1/1685 |
| 2017/0373816 | A1* | 12/2017 | Son | H04W 74/085 |
| 2018/0131553 | A1* | 5/2018 | Choi | H04L 25/38 |
| 2018/0152942 | A1* | 5/2018 | Kwon | H04W 72/12 |
| 2018/0310330 | A1* | 10/2018 | Chun | H04L 5/0053 |
| 2018/0367242 | A1* | 12/2018 | Elsherif | H04L 1/001 |
| 2019/0349179 | A1* | 11/2019 | Son | H04W 74/085 |
| 2022/0014339 | A1* | 1/2022 | Son | H04W 74/085 |

FOREIGN PATENT DOCUMENTS

| | | |
|---|---|---|
| CN | 104322128 | 1/2018 |
| KR | 10-2011-0093559 | 8/2011 |
| TW | 201445952 | 12/2014 |
| WO | 2010/095802 | 8/2010 |
| WO | 2011/108832 | 9/2011 |
| WO | 2012/057546 | 5/2012 |
| WO | 2013/129881 | 9/2013 |
| WO | 2014/007576 | 1/2014 |
| WO | 2014/171788 | 10/2014 |
| WO | 2015/003119 | 1/2015 |
| WO | 2015/009846 | 1/2015 |
| WO | 2016/133371 | 8/2016 |

OTHER PUBLICATIONS

Joonsuk Kim et. al.: "HE-SIG-B Structure", IEEE 802.11-15/0821r2, Jul. 11, 2015. Slides 1-19.
Kaushik Josiam et. al.: "HE-SIG-B Mapping and Compression", IEEE 802.11-15/1315rl, Nov. 9, 2015. Slides 1-19.
Robert Stacey: "Specification Framework for TGax", IEEE 802.11-15/0132r13, Dec. 7, 2015, pp. 1-38.
Notice of Allowance dated Oct. 7, 2019 for Korean Patent Application No. 10-2017-7022552 and its English translation provided by Applicant's foreign counsel.
Office Action dated Nov. 6, 2020 for Korean Patent Application No. 10-2019-7032794 and its English translation provided by Applicant's foreign counsel.
Notice of Allowance dated May 25, 2021 for Korean Patent Application No. 10-2019-7032794 and its English translation provided by Applicant's foreign counsel.
Office Action dated May 19, 2022 for Korean Patent Application No. 10-2021-7027207 and its English translation provided by Applicant's foreign counsel.
International Search Report for PCT/KR2016/001627 dated Jul. 11, 2016 and its English translation from WIPO (published as WO 2016/133371).
Written Opinion of the International Searching Authority for PCT/KR2016/001627 dated Jul. 11, 2016 and its English translation from WIPO (published as WO 2016/133371).
International Preliminary Report on Patentability (Chapter I) for PCT/KR2016/001627 dated Aug. 22, 2017 and its English translation from WIPO (published as WO 2016/133371).
Notice of Allowance for U.S. Appl. No. 15/678,053 dated Apr. 24, 2019 (now published as US 2017/0373816).
Non-Final Office Action for U.S. Appl. No. 15/678,053 dated Nov. 20, 2018 (now published as US 2017/0373816).
Office Action dated Sep. 12, 2019 for Chinese Patent Application No. 201680010529.9 and its English translation provided by Applicant's foreign counsel.
Notice of Allowance dated Apr. 3, 2020 for Chinese Patent Application No. 201680010529.9 and its English translation provided by Applicant's foreign counsel.
Office Action dated Apr. 21, 2020 for Indian Patent Application No. 201737027178.
Notice of Allowance for U.S. Appl. No. 16/520,313 dated Jun. 16, 2021 (now published as US 2019/0349179).
Final Office Action for U.S. Appl. No. 16/520,313 dated Feb. 23, 2021 (now published as US 2019/0349179).
Office Action for U.S. Appl. No. 16/520,313 dated Sep. 10, 2020 (now published as US 2019/0349179).
Office Action dated Nov. 15, 2022 for Chinese Patent Application No. 202010561184.4 and its English translation provided by Applicant's foreign counsel.
Source: Document 5A/TEMP/222: Working Party 5A; Liaison Statement to External Organizations on the Revision Work on Report ITU-R F.2086 (Copy To Itu-T Sg 2 For Information) "Technical and Operational Characteristics and Applications of Broadband Wireless Access in the Fixed Service", 3GPP TSG RANT Meeting #48, RP-100429, Seoul, Korea, Jun. 1-4, 2010, pp. 1-13.

(56) References Cited

OTHER PUBLICATIONS

Office Action dated Dec. 2, 2022 for Chinese Patent Application No. 202010559905.8 and its English translation provided by Applicant's foreign counsel.
Office Action dated Aug. 31, 2022 for Korean Patent Application No. 10-2021-7027207 and its English translation provided by Applicant's foreign counsel.
Notice of Allowance dated Apr. 15, 2023 for Chinese Patent Application No. 202010561184.4 and its English translation provided by Applicant's foreign counsel.
Office Action dated May 31, 2023 for Chinese Patent Application No. 202010559905.8 and its English translation provided by Applicant's foreign counsel.
Office Action dated Jul. 19, 2023 for Korean Patent Application No. 10-2022-7039848 and its English translation provided by Applicant's foreign counsel.

* cited by examiner

| Type | Frame Format | Comm. Type | OFDMA | Uplink | MUSB | PAID [0]~[7] | GID [0] | NSTS [0] | NSTS[1] ~NSTS[3] | GID [1] | NSTS [4] | NSTS[5] ~NSTS[7] |
|---|---|---|---|---|---|---|---|---|---|---|---|---|
| A | SU | DL SU-SISO | 0 | 0 | -(0) | a | 0, 63 | 1 | - | - | - | - |
| A | SU | DL SU-MIMO | 0 | 0 | -(0) | a | 0, 63 | 2~8 | - | - | - | - |
| B | MU | DL MU-SISO | 0 | 0 | -(0) | a~h | 1~62 | 1 | 1 | 1~62 | 1 | 1 |
| B | MU | DL MU-MIMO | 0 | 0 | -(0) | a~h | 1~62 | 1~4 | 1~4 | 1~62 | 1~4 | 1~4 |
| C | SU | UL SU-SISO | 0 | 1 | -(0) | a | 0, 63 | 1 | - | - | - | - |
| C | SU | UL SU-MIMO | 0 | 1 | -(0) | a | 0, 63 | 2~8 | - | - | - | - |
| D | MU | UL MU-SISO | 0 | 1 | -(0) | a~h | 1~62 | 1 | 1 | 1~62 | 1 | 1 |
| D | MU | UL MU-MIMO | 0 | 1 | -(0) | a~h | 1~62 | 1~4 | 1~4 | 1~62 | 1~4 | 1~4 |
| E-1 | MU | DL OFDMA (SU-SISO) | 1 | 0 | 0 | a~h | 1~62 | 1 | 1 | 1~62 | 1 | 1 |
| E-2 | MU | DL OFDMA (SU-MIMO) | 1 | 0 | 0 | a~h | 1~62 | 1~4 | 1~4 | 1~62 | 1~4 | 1~4 |
| F-1 | MU | DL OFDMA (MU-SISO) | 1 | 0 | 1 | a~h | 1~62 | 1 | 1 | 1~62 | 1 | 1 |
| F-2 | MU | DL OFDMA (MU-MIMO) | 1 | 0 | 1 | a~h | 1~62 | 1~4 | 1~4 | 1~62 | 1~4 | 1~4 |
| G | MU | UL OFDMA (SU-SISO) | 1 | 1 | 0 | a~h | 1~62 | 1 | 1 | 1~62 | 1 | 1 |
| G | MU | UL OFDMA (SU-MIMO) | 1 | 1 | 0 | a~h | 1~62 | 1~4 | 1~4 | 1~62 | 1~4 | 1~4 |
| H | MU | UL OFDMA (MU-SISO) | 1 | 1 | 1 | a~h | 1~62 | 1 | 1 | 1~62 | 1 | 1 |
| H | MU | UL OFDMA (MU-MIMO) | 1 | 1 | 1 | a~h | 1~62 | 1~4 | 1~4 | 1~62 | 1~4 | 1~4 |

SIGNALING METHOD FOR MULTI-USER TRANSMISSION, AND WIRELESS COMMUNICATION TERMINAL AND WIRELESS COMMUNICATION METHOD USING SAME

CROSS-REFERENCE TO RELATED APPLICATIONS

This application is a continuation of U.S. patent application Ser. No. 16/520,313 filed on Jul. 23, 2019, which is a continuation of U.S. patent application Ser. No. 15/678,053 filed on Aug. 15, 2017, issued as U.S. Pat. No. 10,411,870 on Sep. 10, 2019, which is a continuation of International Patent Application No. PCT/KR2016/001627 filed on Feb. 17, 2016, which claims the priority to Korean Patent Application No. 10-2015-0024516 filed on Feb. 17, 2015, and Korean Patent Application No. 10-2015-0064992 filed on May 9, 2015, the entire contents of which are incorporated herein by reference.

TECHNICAL FIELD

The present invention relates to a signaling method of a wireless LAN frame for multi-user transmission, and to a wireless communication terminal, and a wireless communication method using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to reduce the possibility of collision of data transmission of a plurality of terminals in a dense user environment and to provide a stable data communication environment.

In addition, the present invention has an object to provide a method by which a plurality of terminals can efficiently perform multi-user transmission.

Technical Solution

In order to achieve the objects, the present invention provides a wireless communication method and a wireless communication terminal as below.

First, an exemplary embodiment of the present invention provides a wireless communication terminal, the terminal including: a transceiver; and a processor, wherein the processor generates a frame including a first signal field and a second signal field, wherein the first signal field includes a bandwidth field indicating total bandwidth information in which the frame is transmitted, and the second signal field includes a resource allocation field indicating arrangement information of resource unit(s) in a frequency band through which the frame is transmitted, and transmits, by the transceiver, the generated frame.

According to an embodiment, the arrangement information of resource unit(s) includes information on the size of each resource unit and the placement thereof in a frequency domain.

In addition, the second signal field further includes user field(s) indicating information of at least one wireless communication terminal allocated to each resource unit.

In this case, the user field(s) includes identifier information and number of streams information of at least one wireless communication terminal allocated to each resource unit.

Furthermore, the user field(s) sequentially indicates information of wireless communication terminal(s) allocated to at least one of the resource unit(s) constituting the frequency band.

According to an embodiment, when the resource allocation field indicates that the frequency band is divided into a plurality of subbands, the frequency band is constituted by 3 to 9 resource units.

In this case, when the frequency band is divided into a plurality of subbands, the frequency band is constituted by a combination of at least one of a first resource unit having a basic size, a second resource unit having a size based on twice the size of the first resource unit, and a third resource unit having a size based on four times the size of the first resource unit.

In addition, the first resource unit has a size based on a value obtained by dividing the frequency band into 9.

Furthermore, the first resource unit comprises 26 subcarriers, the second resource unit comprises 52 subcarriers, and the third resource unit comprises 106 subcarriers.

According to an embodiment, the first signal field includes a predetermined field indicating whether the frame is a multi-user frame using multiple input multiple output (MIMO) without applying orthogonal frequency division multiple access (OFDMA).

In this case, when the predetermined field indicates that the frame is a multi-user frame using multiple MIMO without applying OFDMA, the second signal field does not include the resource allocation field.

In addition, an exemplary embodiment of the present invention provides a wireless communication method of a wireless communication terminal, the method including: generating a frame including a first signal field and a second signal field, wherein the first signal field includes a bandwidth field indicating total bandwidth information in which the frame is transmitted, and the second signal field includes a resource allocation field indicating arrangement information of resource unit(s) in a frequency band through which the frame is transmitted, and transmitting the generated frame.

Advantageous Effects

According to an embodiment of the present invention, efficient multi-user uplink transmission scheduling is possible in a contention-based channel access system.

According to the embodiment of the present invention, it is possible to efficiently transmit resource unit allocation information of for multi-user transmission, to control multi-user transmission.

Also, according to the embodiment of the present invention, it is possible to increase the total resource utilization rate in the contention-based channel access system and improve the performance of the wireless LAN system.

DESCRIPTION OF DRAWINGS

FIG. 16 illustrates various communication types in which MIMO and OFDMA are combined and a configuration of an HE-SIG-A/B field corresponding thereto.

FIGS. 17 to 23 illustrate configurations of the non-legacy wireless LAN frame according to the various communication types described in FIG. 16.

FIG. 24 illustrates an embodiment in which a 20 MHz frequency band is divided into at least one subband to allocate a resource unit.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0024516 and 10-2015-0064992 filed in the Korean Intellectual Property Office and the embodiments and mentioned items described in the respective application, which forms the basis of the priority, shall be included in the Detailed Description of the present application.

Figure 1:
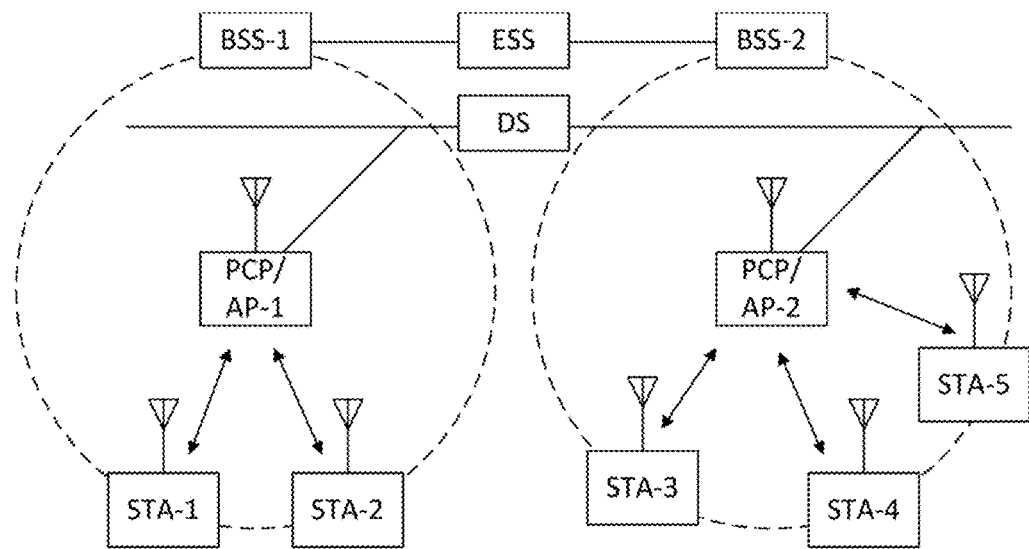
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
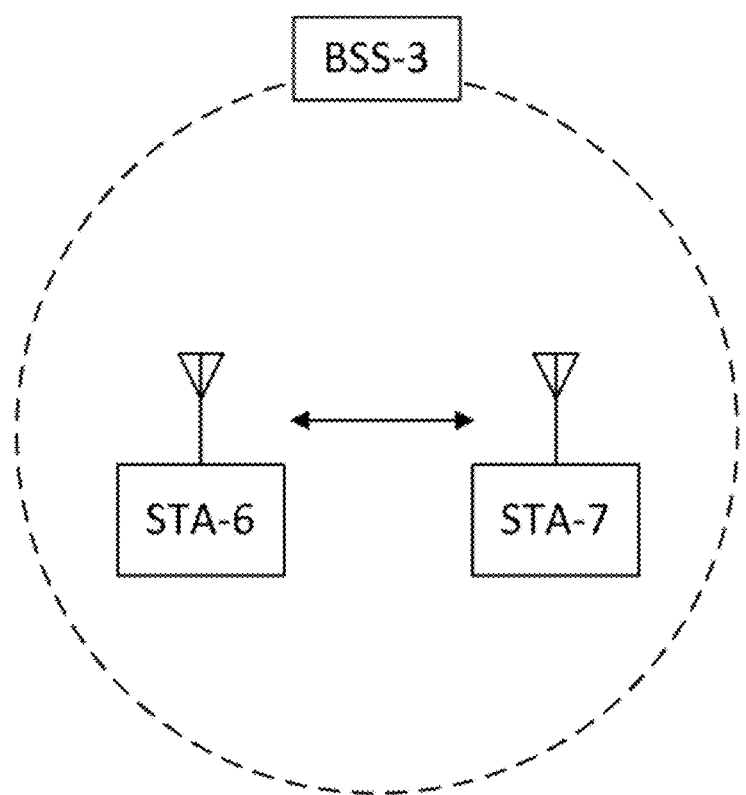
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
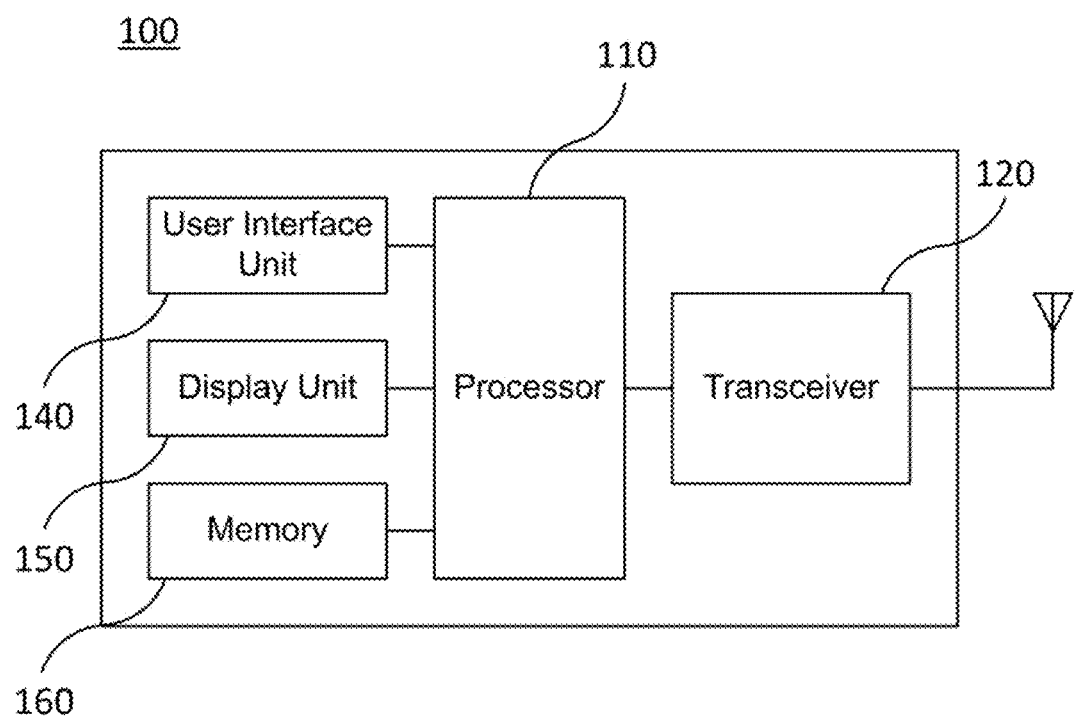
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data.

The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
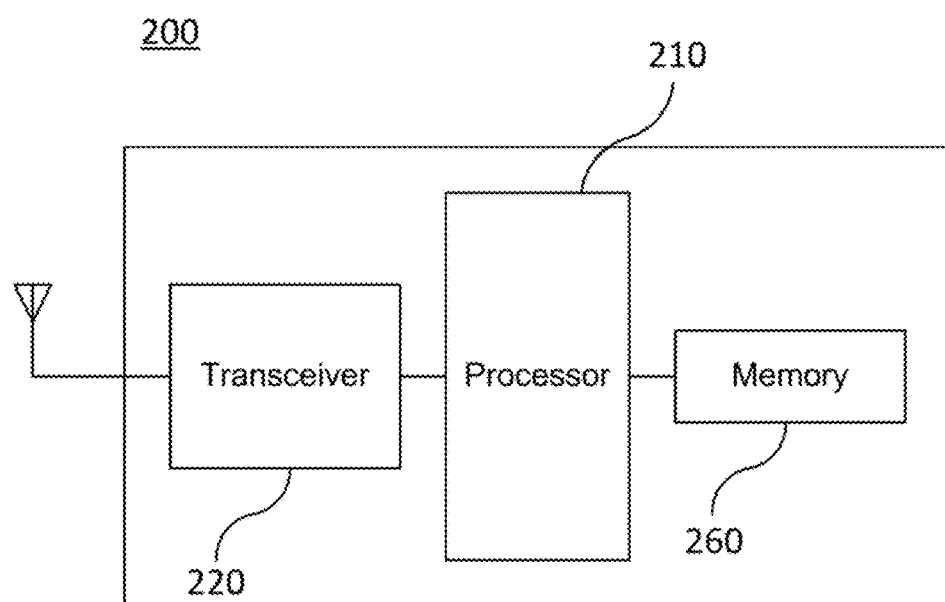
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
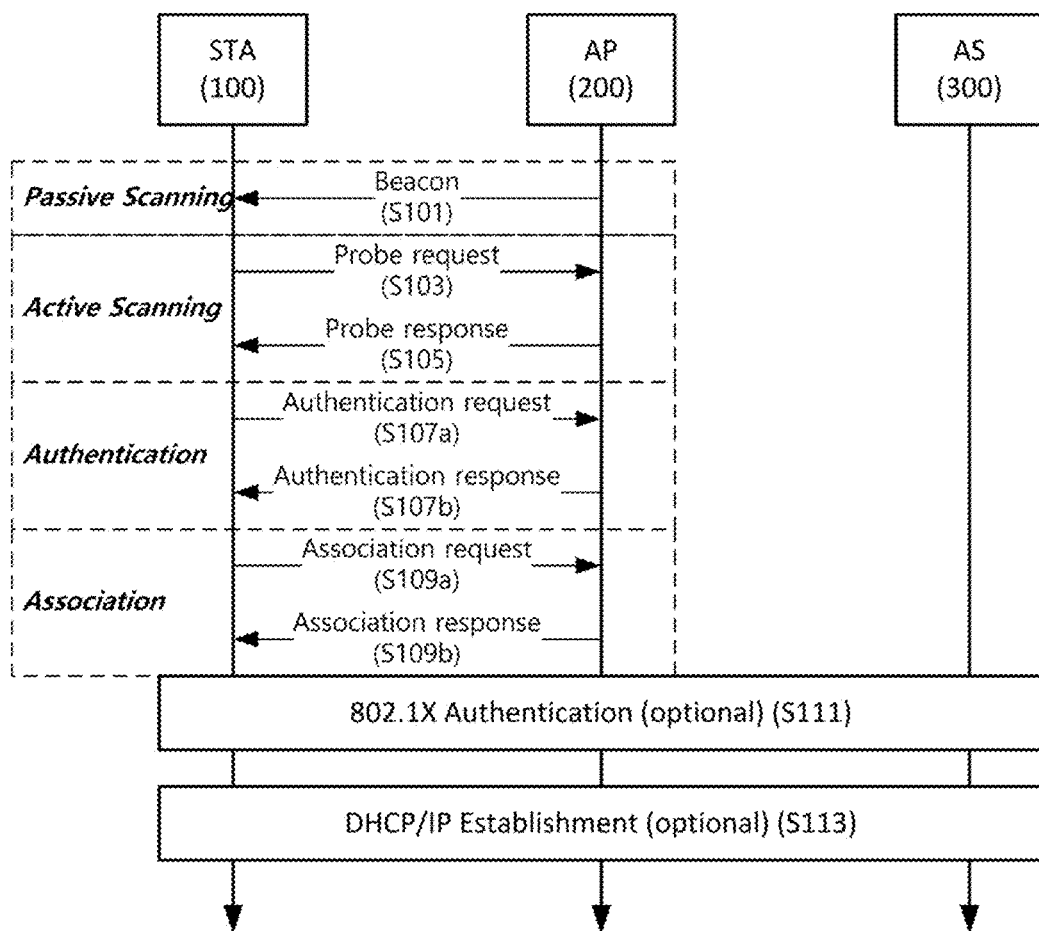
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a multi-user downlink transmission in which an AP simultaneously transmits data to a plurality of STAs, and a multi-user uplink transmission in which a plurality of STAs simultaneously transmit data to the AP may be performed. Hereinafter, an OFDMA transmission method and a MIMO transmission method of a wireless communication terminal will be described with reference to each drawing. The wireless communication terminal of the present invention may generate a wireless frame described in the following embodiments and transmit the generated wireless frame.

Figure 6:
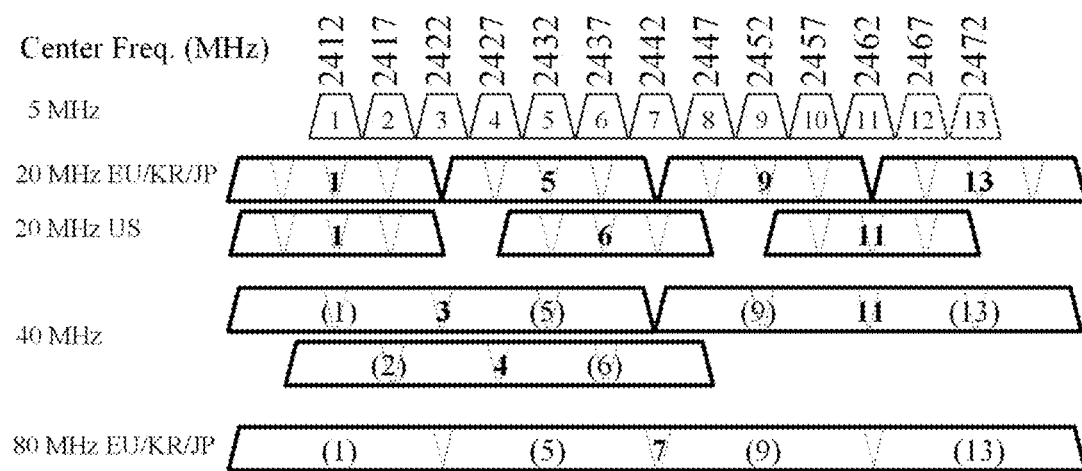
FIG. 6 illustrates an embodiment of a channel allocation method in a 2.4 GHz band for OFDMA.

FIG. 6 illustrates an embodiment of a channel allocation method in a 2.4 GHz band for OFDMA.

An unlicensed frequency band is a designated frequency band for general use. Specifically, the 100 MHz frequency band of 2.4 GHz to 2.5 GHz is the designated unlicensed industrial scientific medical (ISM) frequency band.

A wireless communication terminal that performs wireless LAN communication in the 100 MHz frequency band of 2.4 GHz to 2.5 GHz can use channels 1 to 13 of 5 MHz units. In this case, the channel numbers are given by institute of electrical and electronics engineers (IEEE). Specifically, the center frequency of channel 1 is 2412 MHz, the center frequency of channel 2 is 2417 MHz, and the center frequency of channel 13 is 2472 MHz. In the United States, channels 1 to 11 are used, and most countries outside the US use channels 1 to 13.

Legacy wireless LAN standards such as 802.11a/b/g use only 20 MHz bandwidth. Accordingly, in order to minimize the interference with the adjacent channels, the terminals of the corresponding wireless LAN standard may secure four non-overlapping 20 MHz bands centered on channels 1, 5, 9, and 13, respectively. However, since the channels 12 and 13 cannot be used in the United States, the wireless LAN terminals mainly use three 20 MHz bands centered on channels 1, 6 and 11 to minimize the interference between the channels. On the other hand, it is also possible to set up a channel of the overlapping 20 MHz band centered on consecutive channels such as channels 1, 2, 3, and 4 in the 2.4 GHz band, and thus, interference may occur between adjacent BSSs.

The 802.11n standard additionally defines a 40 MHz bandwidth (BW) allocation. Terminals of the corresponding wireless LAN standard may secure a 40 MHz band centered on channels 3, 4, and 11, respectively. Meanwhile, the non-legacy wireless LAN standard from the 802.11ax standard can apply some functions of the 802.11ac standard, which only operates in the 5 GHz band, to 2.4 GHz band. Therefore, the terminals of the corresponding wireless LAN standard (i.e., non-legacy wireless LAN terminals) may allocate an 80 MHz band centered on channel 7.

When the wireless communication terminal of the present invention uses an OFDMA transmission in the 2.4 GHz band, the terminal may use any one of 20 MHz, 40 MHz and 80 MHz as a total BW. If equal sub-bandwidths (sub-BWs) are allocated to four STAs within the total BW, sub-BW allocation of 5 MHz, 10 MHz or 20 MHz is possible for each STA. If equal sub-BWs are allocated to two STAs within the total BW, then a sub-BW of 10 MHz, 20 MHz or 40 MHz can be allocated to each STA. If unequal sub-BWs are allocated to two, three, or four STAs within the total BW, a variety of sub-BWs ranging from a minimum of 5 MHz to a maximum of 60 MHz can be allocated to each STA.

Figure 7:
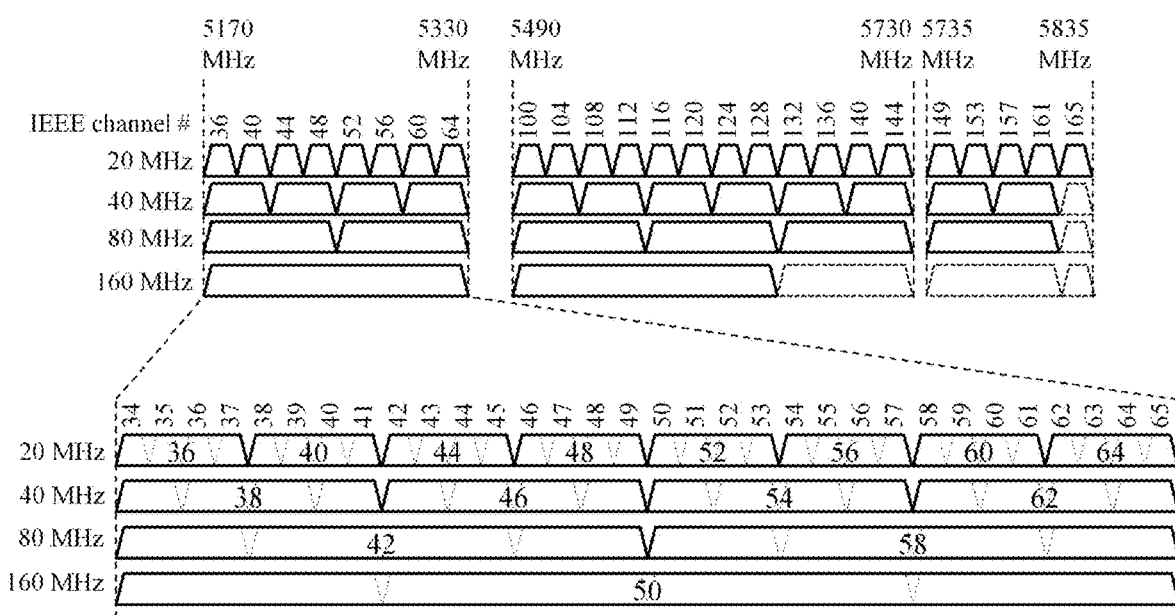
FIG. 7 illustrates an embodiment of a channel allocation method in a 5 GHz band for OFDMA.

FIG. 7 illustrates an embodiment of a channel allocation method in a 5 GHz band for OFDMA.

A 665 MHz frequency band from 5.170 GHz to 5.835 GHz is also the designated unlicensed ISM frequency band. A wireless communication terminal that performs wireless LAN communication selects and uses various non-overlapping channels in the 5 GHz frequency band.

The channel numbers in units of 5 MHz assigned by IEEE is used in the 5 GHz frequency band. In this case, the start frequency of the channel 34 is 5170 MHz, and the start frequency of the channel 35 is 5175 MHz. In addition, the center frequency of the channel having a 20 MHz bandwidth combining the channels 34 to 37 is the same as the start frequency of the channel 36. Therefore, a channel having a 20 MHz bandwidth combining the channels 34 to 37 may be referred to as a 20 MHz channel 36. The wireless communication terminal may use only non-overlapping 20 MHz channels such as channel 36, channel 40, and channel 44 in the 5 GHz frequency band, and cannot use channels overlapping with adjacent channels as in the 2.4 GHz band.

The wireless communication terminal according to the embodiment of the present invention may use any of 20 MHz, 40 MHz, 80 MHz or 160 MHz as a total BW in the 5 GHz band. If equal sub-bandwidths (sub-BWs) are allocated to four STAs within the total BW, sub-BW allocation of 5 MHz, 10 MHz, 20 MHz or 40 MHz is possible for each STA. If equal sub-BWs are allocated to two STAs within the total BW, then a sub-BW of 10 MHz, 20 MHz, 40 MHz or 80 MHz can be allocated to each STA. If unequal sub-BWs are allocated to two, three, or four STAs within the total BW, a variety of sub-BWs ranging from a minimum of 5 MHz to a maximum of 120 MHz can be allocated to each STA.

In the 2.4 GHz band and the 5 GHz band, an AP operating the BSS may transmit static information such as primary channel which it operates and BSS operating bandwidth through a periodic beacon message. Also, the AP may signal dynamic information such as total bands occupied by a certain data frame transmitted through OFDMA and a sub-band for each STA through a header part of the corresponding data frame. In the present invention, various signaling methods for the dynamic subband allocation and the MIMO transmission in the corresponding subband will be described.

Figure 8:
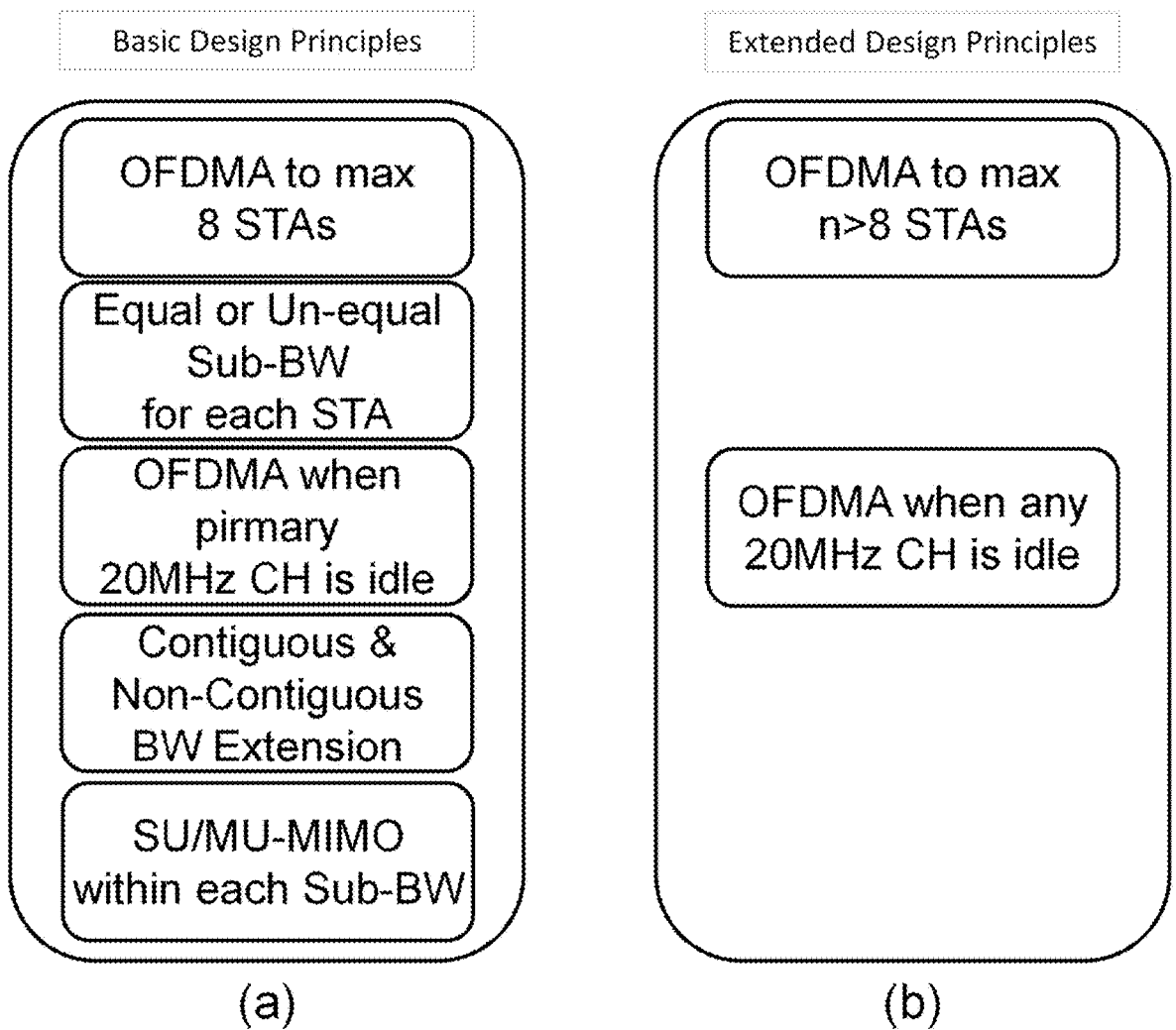
FIG. 8 illustrates MIMO and OFDMA operating principles of a wireless communication terminal according to an embodiment of the present invention.

FIG. 8 illustrates MIMO and OFDMA operating principles of a wireless communication terminal according to an embodiment of the present invention. The wireless communication terminal according to the embodiment of the present invention may transmit a MIMO/OFDMA packet according to the basic principle illustrated in FIG. 8 (*a*) or the extended principle illustrated in FIG. 8 (*b*).

FIG. 8 (*a*) illustrates a basic design principle of a MIMO transmission and an OFDMA transmission according to an embodiment of the present invention.

First, the AP can simultaneously transmit data to a maximum of eight STAs and simultaneously receive data from a maximum of eight STAs. The existing 802.11ac standard supports simultaneous transmission to up to four STAs through multi-user MIMO (MU-MIMO). According to the embodiment of the present invention, in the non-legacy wireless LAN system, the AP can transmit data to up to eight STAs through a combination of MIMO and OFDMA. For this purpose, a signaling field for a multi-user transmission may be newly designed in a non-legacy wireless LAN system.

Next, the AP can allocate an equal or unequal sub-BW to each STA. If the AP allocates only equal bandwidth to STAs, a specific band may not be allocated to any STA according to the distribution of channel (or subchannel) allocation to each STA at a certain time point. In addition, when the AP allocates only equal bandwidth to STAs, it is difficult to intensively transmit a large amount of data to a specific STA or to intensively receive a large amount of data from a specific STA. Therefore, the AP may perform the OFDMA transmission by allocating unequal sub-BW as well as equal sub-BW.

Next, the wireless communication terminal of the present invention performs the OFDMA transmission only when the basic primary channel is idle. In an embodiment of the present invention, the basic primary channel may be a primary 20 MHz channel. If an OFDMA packet of a corresponding BSS is transmitted through a secondary channel while a wireless packet of another BSS is transmitted through a primary 20 MHz channel of a specific BSS, the receiving terminal has a burden of continuously performing clear channel assessment (CCA) in the channel of total BW. Therefore, the wireless communication terminal may perform the OFDMA transmission according to the basic design principle, thereby reducing the burden of CCA on the receiving terminal.

Next, the wireless communication terminal of the present invention may perform a single user MIMO (SU-MIMO) transmission or a multi-user MIMO (MU-MIMO) transmission within a subband. When the SU-MIMO is supported, a signaling overhead and a hardware complexity of the wireless communication terminal can be reduced. On the other hand, when the MU-MIMO as well as the SU-MIMO is supported, the AP can perform communication using a larger number of spatial streams to a larger number of STAs.

Although not illustrated in FIG. 8 (a), the following basic design principles may be further applied. An HE-SIG-A field of the non-legacy wireless LAN frame applies 64 FFT orthogonal frequency division multiplexing (OFDM), and has a fixed length of x symbols. An HE-SIG-B field of the non-legacy wireless LAN frame applies 64 FFT OFDM and has a variable length of y symbols. When multi-channel transmission is performed, the HE-SIG-A and HE-SIG-B may be repeatedly transmitted in units of 20 MHz.

An HE-STF-short field used for a downlink SU/MU transmission or an uplink SU transmission is repeatedly transmitted 5 times with a signal waveform of 0.8 us. An HE-STF-long field used for a downlink SU/MU transmission or an uplink SU transmission is repeated 5 times with a signal waveform of 1.6 us. The HE-STF-short/long field does not require a separate signaling, as it is clear which STF option is to be used depending on the configuration of the PHY protocol data unit (PPDU).

An HE-LTF-short field used for indoor transmission has a length of 6.4 us+guard interval (GI), and an HE-LTF-long field used for outdoor transmission has a length of 12.8 us+GI. Since the HE-LTF-short/long field is variable depending on the channel conditions regardless of the configuration of the PPDU, a separate signaling is required. In addition, when LTF transmission is performed for each STA in the uplink MU-MIMO transmission, another STA may maintain an idle state.

FIG. 8 (b) illustrates an extended design principle of a MIMO transmission and an OFDMA transmission according to an embodiment of the present invention. First, the AP can simultaneously transmit data to more than 8 STAs and simultaneously receive data from more than 8 STAs. In addition, the wireless communication terminal can perform an OFDMA transmission when any secondary channel is idle even if the basic primary channel is busy. When it is desired to maximize the performance of the MIMO transmission and the OFDMA transmission, the wireless communication terminal can perform communication according to the extended design principle.

Although not illustrated in FIG. 8 (b), the following extended design principles may be further applied. When the multi-channel transmission is performed, HE-SIG-B having different information for each 20 MHz band can be transmitted. In addition, when an LTF transmission for each STA is performed in the uplink MU-MIMO transmission, a plurality of STAs can multiplex and transmit the LTF.

Figure 9:
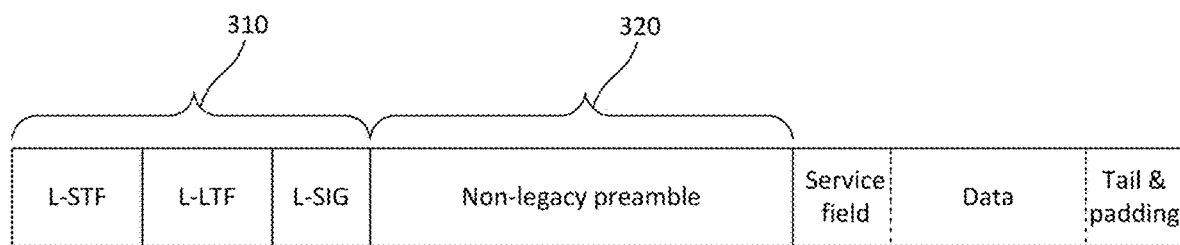
FIG. 9 illustrates a frame structure of a wireless LAN signal according to an embodiment of the present invention.

FIG. 9 illustrates a frame structure of a wireless LAN signal according to an embodiment of the present invention. Referring to FIG. 9, a wireless LAN signal according to an embodiment of the present invention includes a legacy preamble 310 for a legacy terminal (e.g., a terminal based on 802.11a/g standard) and a non-legacy preamble 320 for the a non-legacy terminal (e.g., a terminal based on 802.11ax standard). First, the legacy preamble 310 includes legacy wireless LAN information which can be decoded by legacy terminals, for example, a legacy short training field (L-STF), a legacy long training field (L-LTF), and a legacy signal field (L-SIG). Next, the non-legacy preamble 320 includes non-legacy wireless LAN information which can be decoded only by non-legacy terminals, and the non-legacy wireless LAN information may not be decodable by legacy terminals. Meanwhile, the legacy preamble 310 may include at least some of non-legacy wireless LAN information which can be decoded by non-legacy terminals according to an embodiment.

Figure 10:
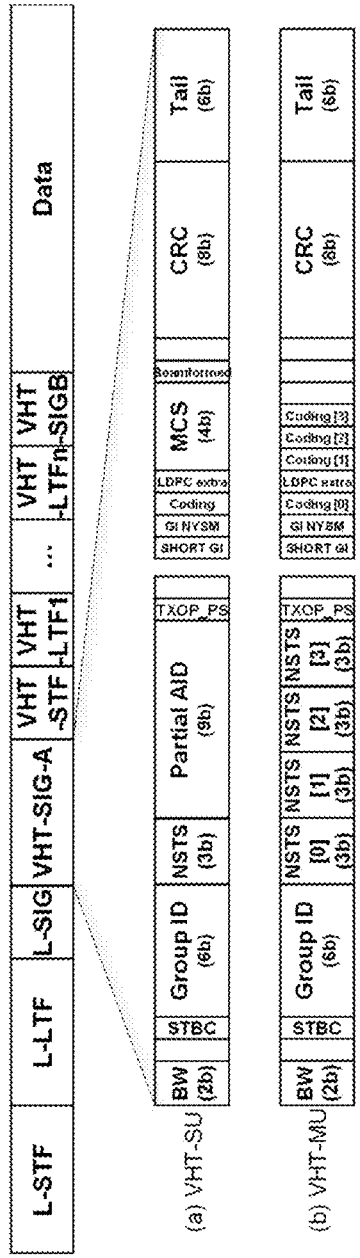
FIG. 10 illustrates a configuration of a VHT frame and a detailed configuration of a VHT-SIG-A field which are used in the 802.11ac standard.

FIG. 10 illustrates a configuration of a VHT frame and a detailed configuration of a VHT-SIG-A field which are used in the 802.11ac standard.

The 802.11ac standard, also called VHT (Very High Throughput), supports downlink MU-MIMO. Therefore, the configuration of the VHT-SIG-A differs depending on whether the corresponding data frame is a single user (SU) data frame or a multiple user (MU) data frame. FIG. 10 (a) and FIG. 10 (b) illustrate the VHT-SIG-A of SU frame and the VHT-SIG-A of MU frame, respectively.

First, FIG. 10 (a) illustrates an embodiment of the SU frame format. The frame for the SU may include at least on of a BW field, an STBC field, a Goup ID field, an NSTS field, a Partial AID field, a TXOP_PS field, a SHORT GI field, a GI_NYSM field, a Coding field, an LDPC extra field, an MCS field, a Beamformed field, a CRC field, and a Tail field.

The BW field indicates the bandwidth of the frequency band in which the frame is transmitted. In a specific embodiment, the BW field may indicate 20 MHz, 40 MHz, 80 MHz, or 160 (including 80+80) MHz. The STBC field indicates whether a space time block coding is applied or not. The Group ID field indicates whether the frame is a frame for SU. Specifically, if the value of the Group ID field is a specific value, it may indicate that the frame is a frame for SU. In this case, the specific value may be at least one of 0 and 63.

The NSTS field indicates the number of space-time streams to be transmitted to the STA. In this case, the number of transmissions of VHT-LTF varies depending on the number of space-time streams. This is because, if the number of space-time streams is different, the number of VHT-LTFs required to identify the space-time streams varies. The number of VHT-LTFs required to identify the space-time streams may vary depending on at least one of a channel estimation method and a phase pattern applied to a subcarrier included in the VHT-LTF. In this case, 1, 2, 4, 6 or 8 VHT-LTF(s) are transmitted when the number of space-time streams is 1, 2, 4, 6 or 8, respectively. Further, 4, 6 or 8 VHT-LTFs are transmitted, when the number of space-time streams is 3, 5, or 7, respectively.

The Partial AID field indicates a partial association ID (AID) of a STA to receive the frame. The STA may determine whether to receive the frame based on the Partial AID field. Specifically, the STA may receive the frame if the Partial AID field value indicates the corresponding STA. The TXOP_PS field indicates whether or not a wireless communication terminal other than the wireless communication terminal receiving the frame during the transmission of the frame by the AP can enter a power save mode.

The SHORT GI field indicates whether the data field included in the frame has a relatively short guard interval (GI) value. The GI_NSYM field indicates the number of symbols (NSYM) value when a short GI is used. The Coding field indicates whether low density parity check (LDPC) coding is applied to the data. The LDPC extra field indicates whether LDPC coding is applied to the data to include additional OFDM symbols. The MCS field indicates a modulation and coding scheme of a signal including data. The Beamformed field indicates whether beamforming is applied. The CRC field indicates information for error checking of the SIG-A field. The Tail field indicates the end of the SIG-A field.

First, FIG. 10 (a) illustrates an embodiment of the MU frame format. The frame for the MU includes at least one of a BW field, an STBC field, a Group ID field, a plurality of NSTS fields, a TXOP_PS field, a SHORT GI field, a GI_NYSM field, a plurality of Coding fields, an LDPC extra field, a CRC field, and a Tail field.

The Group ID field indicates a group identifier for identifying a group including STAs to receive the frame. Specifically, the Group ID field may have a value of 1 to 62, but not 0 or 63. In this case, the value of the Group ID field identifies a group including a plurality of STAs. In this case, the number of the plurality of STAs may be four.

The plurality of NSTS fields indicate the number of space-time streams to be transmitted to each STA belonging to the group indicated by the Group ID. Specifically, the value of the NSTS field is the number of wireless streams transmitted to the STA. For MU frames, the MCS value for each STA is signaled by SIG-B. The definitions of other fields of the MU frame in FIG. 10 (b) are the same as that described through the SU frame.

Figure 11:
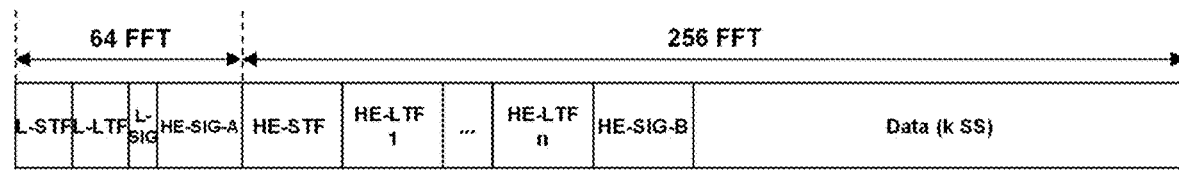
FIG. 11 illustrates a configuration of a non-legacy wireless LAN frame according to an embodiment of the present invention.

FIG. 11 illustrates a configuration of a non-legacy wireless LAN frame according to an embodiment of the present invention. In FIG. 11, definitions of L-STF, L-LTF, and L-SIG are the same as described above in FIG. 10.

HE-SIG-A, HE-STF, HE-LTF, HE-SIG-B and DATA of the non-legacy wireless LAN frame indicate a signal field A, a short training field, a long training field, a signal field B, and data for a non-legacy terminal, respectively. According to an embodiment of FIG. 11, the L-STF, the L-LTF, the L-SIG, and the HE-SIG-A of the non-legacy wireless LAN frame are composed of 64 FFT-based OFDM symbols, the portion from the HE-STF to the data frame is composed of 256 FFT-based OFDM symbols.

Signaling information for the MIMO transmission and the OFDMA transmission in the non-legacy wireless LAN frame may be represented through HE-SIG-A and HE-SIG-B. First, HE-SIG-A consists of fixed x symbols, and signals information that is commonly applied to multiple users in the PPDU. HE-SIG-A may include length information of HE-SIG-B having a variable length. HE-SIG-B consists of variable 0 to y symbols, and carries information applied to each user. More specifically, when the corresponding PPDU is an MU PPDU, HE-SIG-B may indicate resource allocation information for each user. As the number of HE-SIG-B symbols increases, the maximum number of multi-user STAs that can communicate through the corresponding PPDU may increase. According to an embodiment of the present invention, HE-SIG-A and HE-SIG-B may be referred to as a first SIG and a second SIG, respectively.

HE-STF indicates a short training field that can be decoded by non-legacy terminals. The non-legacy terminal may perform automatic gain control and frequency offset detection on OFDM symbols including HE-LTF, HE-SIG-B, and data of payload based on the HE-STF. HE-STF is classified into HE-STF-short or HE-STF-long depending on the application. HE-STF-short is used in the downlink SU PPDU, the downlink MU PPDU, and the uplink SU PPDUs, and has a total length of 4.0 us, in which a signal pattern of 0.8 us is repeated five times on the time axis. HE-STF-long is used in the uplink MU PPDU, and has a total length of 8.0 us, in which a signal pattern of 1.6 us is repeated five times on the time axis.

HE-LTF indicates a long training field that can be decoded by non-legacy terminals. HE-LTF is used to estimate the channel when a beamforming transmission or a MIMO transmission is performed between the transmitting STA and the receiving STA. HE-LTF may be transmitted in a variable number in proportion to the number of spatial streams utilized between the transmitting and receiving STAs. HE-LTF is classified into HE-LTF-short or HE-LTF-long depending on the application. HE-LTF-short is used in indoor communication and has a length of 6.4 us+guard interval (GI). HE-LTF-long is used in outdoor communication and has a length of 12.8 us+GI.

Figure 12:
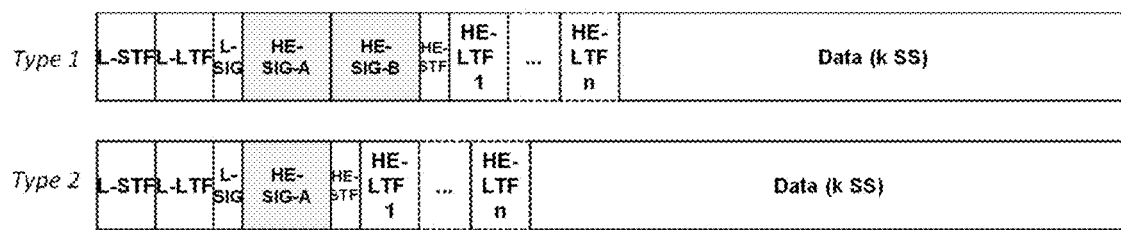
FIG. 12 illustrates configurations of a non-legacy wireless LAN frame according to communication types.

FIG. 12 illustrates configurations of a non-legacy wireless LAN frame according to communication types. The first type (e.g., Type 1) may be used in the downlink SU frame, the uplink SU frame, and the downlink MU frame. The second type (e.g., Type 2) may be used in the uplink MU frame.

HE-SIG-A of the non-legacy wireless LAN frame includes total BW information of the corresponding PPDU. Also, HE-SIG-A of the MU frame includes information that is commonly applied to multiple users. HE-SIG-B of the first type frame indicates subband division information within the total BW. According to an exemplary embodiment, the HE-SIG-B may indicate subband division information through a predetermined resource allocation (RA) field. In addition, HE-SIG-B contains information applied to each STA. The information applied to each STA includes at least one of partial AID (PAID) information, NSTS information, MCS information, and data length information of each STA. On the other hand, HE-SIG-B may be omitted in the second type frame.

Figure 13:
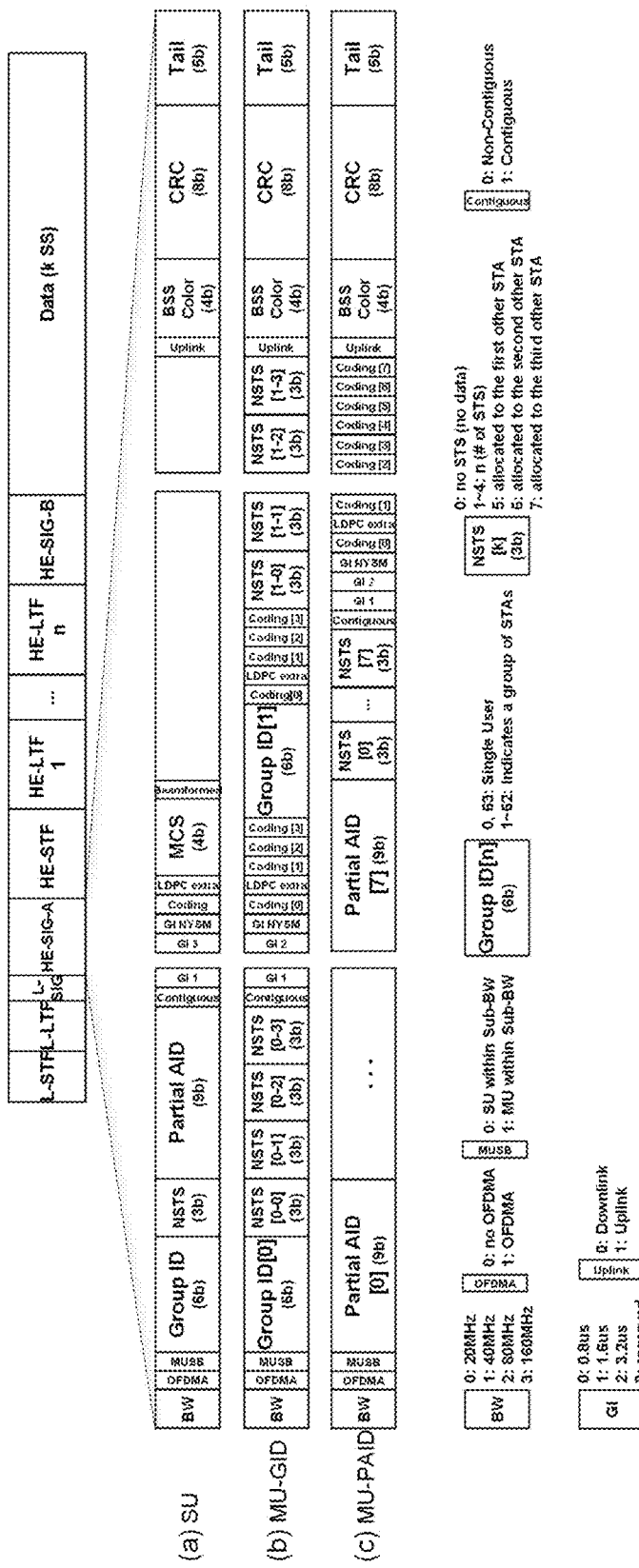
FIG. 13 illustrates an embodiment of a configuration of HE-SIG-A of a non-legacy wireless LAN frame.

FIG. 13 illustrates an embodiment of a configuration of HE-SIG-A of a non-legacy wireless LAN frame.

The non-legacy wireless LAN systems may support a MIMO transmission and an OFDMA transmission. FIG. 13 (a) illustrates a non-legacy SU frame, and FIG. 13 (b) and FIG. 13 (c) illustrate a non-legacy MU frame. In addition, FIG. 13 (b) illustrates an MU frame signaled using a Group ID, and FIG. 13 (c) illustrates an MU frame signaled using a PAID. Each field of the non-legacy wireless LAN frame illustrated in FIG. 13 will now be described.

A BW field indicates the total bandwidth information through which the frame is transmitted. According to an embodiment, the BW field may indicate any one of 20, 40, 80 or 160 (including 80+80) MHz. In the case of the MU-MIMO transmission, wireless streams directed to a maximum of eight STAs within the total bandwidth can be simultaneously transmitted. In the case of SU-SISO transmission using OFDMA, the total bandwidth can be divided into a plurality of subbands, and wireless data directed to a single STA in each subband may be transmitted by SISO. In the case of SU-MIMO transmission using OFDMA, the total bandwidth is divided into a plurality of subbands, and wireless data directed to a single STA in each subband may be transmitted using a MIMO format. In the case of MU-MIMO transmission using OFDMA, the total bandwidth is divided into a plurality of subbands, and wireless data directed to a plurality of STAs in each subband may be transmitted using the MU-MIMO format.

An OFDMA field indicates whether OFDMA is applied to the corresponding frame. When the value of the OFDMA field is 0, it indicates a frame in which OFDMA is not used. When the value of the OFDMA field is 1, it indicates a frame in which OFDMA is used. The OFDMA field is set to 0 both in the DL SU frame and the UL SU frame. The OFDMA field is also set to 0 in the MU frame using the MIMO without applying OFDMA. If the OFDMA field is set to 1, SU-MIMO or MU-MIMO may be used within each subband of the frame.

An MUSB field indicates whether MU-MIMO is used in each subband when the OFDMA field is 1. When the value of the MUSB field is 1, it indicates that MU-MIMO is used in each subband. When the value of the MUSB field is 0, it indicates that SU-SISO or SU-MIMO is used in each subband.

A Group ID field has a value from 0 to 63. If the value of the Group ID field is 0 or 63, it indicates a SU frame. If the value of the Group ID field is a value between 1 and 62, it indicates an MU frame and the field value indicates a group identifier composed of a maximum of four STAs. Therefore, when the value of the Group ID field is any one of 1 to 62, it is possible to indicate an MU frame explicitly.

An NSTS field indicates the number of space-time wireless streams. That is, the NSTS field indicates the number of wireless streams used to transmit the corresponding frame through MIMO. There is only one NSTS field in the SU frame, and the field indicates that 1, 2, . . . , 8 wireless streams are transmitted when the field value is 000, 001, . . . , 111, respectively. In this case, 1, 2, 4, 6 or 8 HE-LTF(s) are transmitted when the number of wireless streams is 1, 2, 4, 6 or 8, respectively. Further, 4, 6 or 8 HE-LTFs are transmitted, when the number of wireless streams is 3, 5, or 7, respectively.

The MU frame includes a plurality of NSTS fields (e.g., NSTS [0], NSTS [1], NSTS [2] and NSTS [3]). Referring to FIG. 13 (b), each of the plurality of NSTS fields may represent the individual NSTS value of each STA belonging to the group indicated by GID[0]. Further, referring to FIG. 13 (c), each of the plurality of NSTS fields may represent the individual NSTS value of each STA indicated by a plurality of PAID fields (e.g., PAID[0] to PAID[3]). The MU frame may include an additional plurality of NSTS fields (e.g., NSTS[4], NSTS[5], NSTS[6] and NSTS[7]). Each additional NSTS field represents the individual NSTS value of each STA belonging to the group indicated by GID[1] or the individual NSTS value of each STA indicated by PAID[4] through PAID[7]. In this case, when NSTS[k] is 000, 001, 010, 011 or 100, it represents that the number of wireless streams directed to the corresponding STA is 0, 1, 2, 3, or 4, respectively. In the MU-MIMO, since more than five wireless streams are not used for each STA, the values 101, 110 and 111 of the NSTS field may be used for other purposes.

A Partial AID represents a part of the association ID (AID) of the STA to receive the frame. The Partial AID of the UL SU frame represents a part of the AID of the AP to receive the frame. In this case, since all the STAs of the corresponding BSS recognize the AID of the AP, it is possible to distinguish the frames belonging to the own BSS and the frames belonging to other BSS without additional information in case of the UL frame. The partial AID of the DL SU frame represents a part of the AID of the non-AP STA to receive the frame.

A BSS Color field indicates an identifier uniquely used in the BSS. The BSS Color field may be represented by the abbreviated information of the BSS identifier or may be represented by predetermined information for distinguishing between different BSSs. The GI field indicates information of a guard interval used in the data field of the non-legacy wireless LAN frame. The Uplink (1 bit) field indicates whether the corresponding frame is a UL frame. If the value of the Uplink field is 0, it indicates that the corresponding frame is a DL frame. If the value of the Uplink field is 1, it indicates that the corresponding frame is a UL frame. On the other hand, when the value of the Group ID field is 0 or 63, it indicates an SU frame. According to an embodiment, the Group ID may be set to indicate a DL SU frame when the value is 0, and a UL SU frame when the value is 63 (or vice versa). In this case, the indication of the Uplink field may be omitted.

Figure 14:
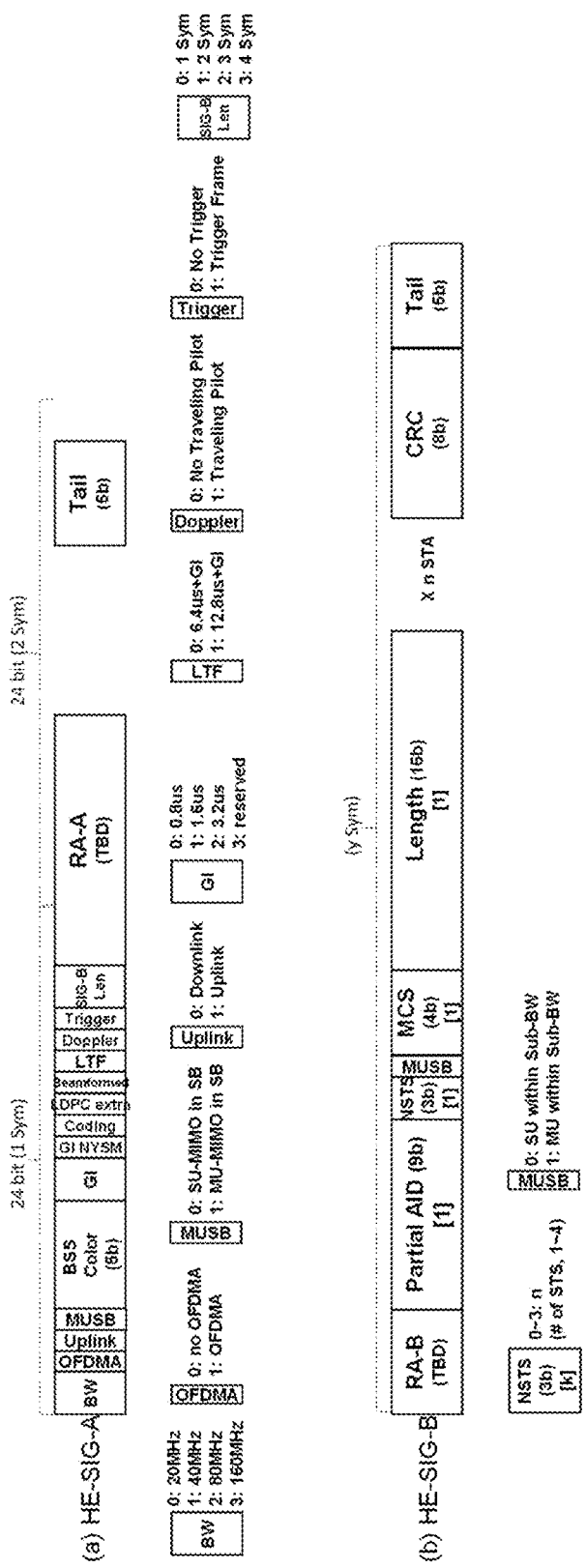
FIG. 14 illustrates an additional embodiment of a detailed configuration of HE-SIG-A and HE-SIG-B of a non-legacy wireless LAN frame.

FIG. 14 illustrates an additional embodiment of a detailed configuration of HE-SIG-A and HE-SIG-B of a non-legacy wireless LAN frame. In the embodiment of FIG. 14, the same or corresponding parts as those of the embodiment of FIG. 13 described above will be omitted.

FIG. 14 (a) illustrates a detailed configuration of the HE-SIG-A of the non-legacy wireless LAN frame. In the FIG. 14 (a), the definitions of the BW field, the OFDMA field, the MUSB field, the Uplink field, the GI field, and the BSS color field are the same as described in FIG. 13. According to the embodiment of FIG. 14 (a), the HE-SIG-A of the non-legacy wireless LAN frame may further include a trigger field. The trigger field indicates whether to trigger simultaneous uplink transmissions of multiple STAs. If the trigger field is set to 1, it indicates that the corresponding PPDU triggers simultaneous uplink transmissions of multiple STAs. If the trigger field is set to 0, it indicates that the corresponding PPDU is not a trigger PPDU.

FIG. 14 (b) illustrates a detailed configuration of the HE-SIG-B of the non-legacy wireless LAN frame.

HE-SIG-B contains a resource allocation (e.g., RA-B) field. The RA-B field indicates division information of a plurality of subbands within a frequency band through which the frame is transmitted. According to an embodiment, the HE-SIG-B may be transmitted in units of 20 MHz band, and the frequency band refers to a 20 MHz band. According to an embodiment of the present invention, a frequency band through which the non-legacy wireless LAN frame is transmitted may be configured with at least one resource unit. The RA-B field indicates arrangement information of the resource unit(s) in the frequency band in which the non-legacy wireless LAN frame is transmitted. The arrangement information of the resource units includes size information of each resource unit constituting the non-legacy wireless LAN frame. The arrangement information of the resource units includes placement information of each resource unit constituting the non-legacy wireless LAN frame in the frequency domain. The RA-B field may be transmitted as common control information for a plurality of users.

According to an additional embodiment of the present invention, whether to transmit the RA-B field may be determined based on the information of HE-SIG-A. As described above, the HE-SIG-A may include an OFDMA field indicating whether OFDMA is applied to the corresponding frame. If the value of the OFDMA field is 0, that is, if OFDMA is not applied to the corresponding frame, then HE-SIG-B may not include the RA-B field.

According to an embodiment of the present invention, the HE-SIG-B further includes user field(s) indicating information of at least one wireless communication terminal allocated to each resource unit constituting the non-legacy wireless LAN frame. The user field(s) includes identifier information and number of streams information of at least one wireless communication terminal allocated to each resource unit.

The identifier information of the wireless communication terminal may be represented by an AID field or a Partial AID field of the wireless communication terminal to receive the frame. The partial AID of the SU DL frame represents a part of the AID of the non-AP STA to receive the frame.

The number of streams information may be represented by the NSTS field. As described above, the NSTS field indicates the number of space-time streams to be transmitted to the STA. The user field(s) may further include a MUSB field. The MUSB field indicates a situation where the STA indicated by the partial AID performs transmission and reception with other STAs using the MU-MIMO transmission in the corresponding subband. In this case, the MUSB fields of the corresponding STAs are all set to 1.

According to the embodiment of the present invention, the user field(s) may sequentially indicate information of wireless communication terminal(s) allocated to at least one resource unit constituting a frequency band. That is, when there are n STAs allocated to the resource unit(s) constituting the frequency band, n sets of user field(s) are transmitted. Therefore, the HE-SIG-B is set to a variable length according to the number of transmission target terminals, and the total length information of the HE-SIG-B may be indicated in the HE-SIG-A.

Figure 15:
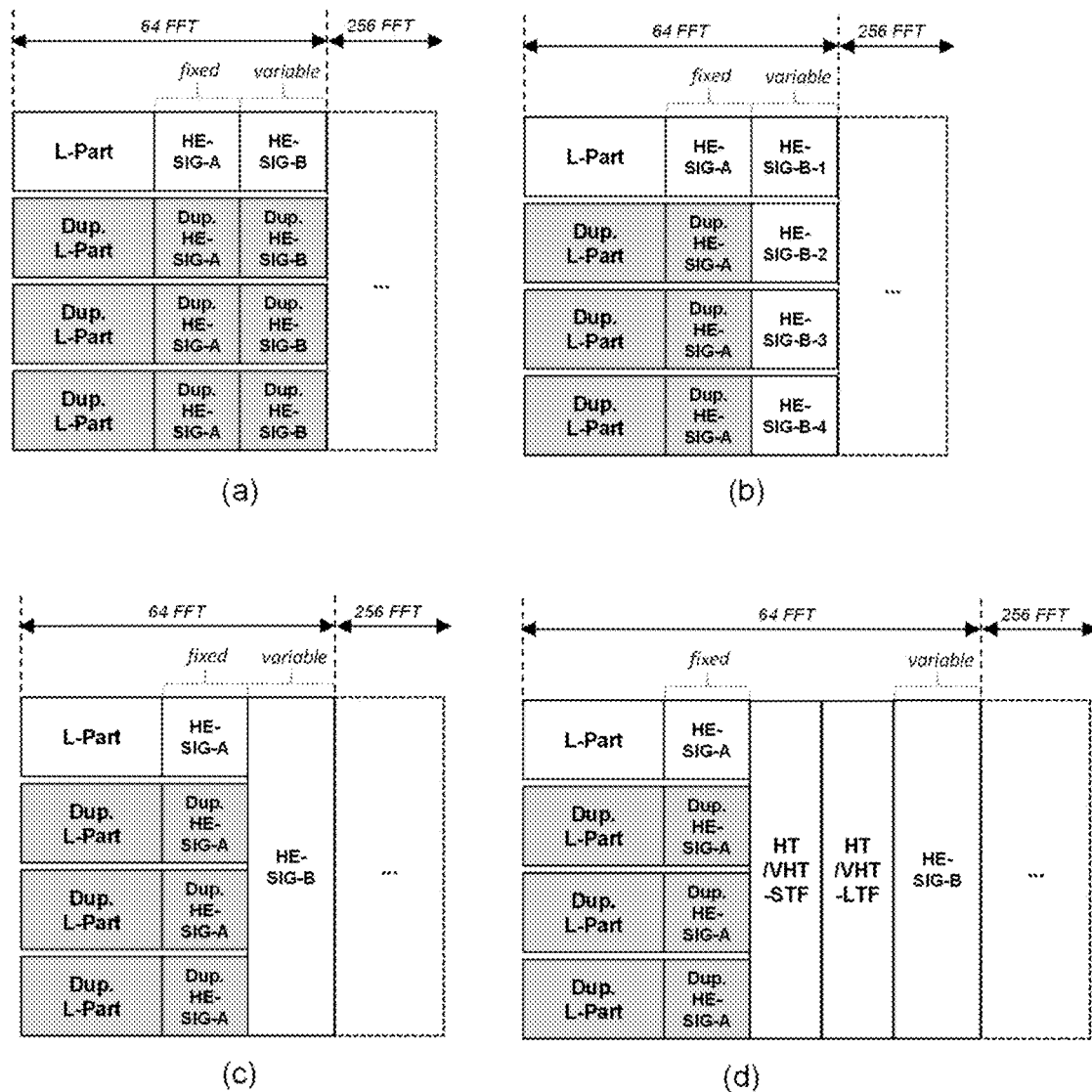
FIG. 15 illustrates a method for transmitting HE-SIG-B of a non-legacy wireless LAN frame in a multi-channel.

FIG. 15 illustrates a method for transmitting HE-SIG-B of a non-legacy wireless LAN frame in a multi-channel. In the embodiment of FIG. 15, the L-part composed of L-STF, L-LTF and L-SIG and the HE-SIG-A are repeatedly transmitted with the same information every 20 MHz in a multi-channel transmission.

According to the embodiment of FIG. 15 (*a*), HE-SIG-B of the non-legacy wireless LAN frame may be transmitted with the same information every 20 MHz like the L-Part and the HE-SIG-A. According to the above embodiment, the STA receiving any 20 MHz channel including the primary channel within the total bands can receive information of HE-SIG-B. However, resources of the multi-channel transmission may be wasted because the same information is transmitted every 20 MHz.

According to the embodiment of FIG. 15 (*b*), HE-SIG-B of the non-legacy wireless LAN frame carries individual information for each 20 MHz, unlike L-Part and HE-SIG-A. According to the above embodiment, it has an advantage of not wasting resources because different HE-SIG-B information is transmitted for each 20 MHz channel. However, a plurality of reception channels for independently receiving information input for each of a plurality of 20 MHz channels are required. Further, individual data length field, a CRC field, a Tail field, and the like may be unnecessarily repeated for each HE-SIG-B. The STA receiving any 20 MHz channel including the primary channel in the total bands can receive the information of HE-SIG-B.

According to the embodiment of FIG. 15 (*c*), HE-SIG-B of the non-legacy wireless LAN frame carries information through the total bands, unlike the L-Part and the HE-SIG-A. According to the embodiment, it has an advantage of not wasting resources because HE-SIG-B information is transmitted using all the total bands. However, since automatic gain control and channel estimation are performed through L-STF/LTF received for each of a plurality of 20 MHz channels, and automatic gain control and channel estimation in the total bands have not been performed, a normal reception of HE-SIG-B may not be possible. In order to solve this problem, data may not be transmitted through subcarriers belonging to the guard band in which channel estimation is not performed during the channel estimation of each 20 MHz channel, and receiving terminals may receive data by excluding the corresponding subcarriers. According to an exemplary embodiment, the wireless communication terminal may attempt to receive data after performing channel estimation of subcarriers belonging to the guard band by performing interpolation on neighboring subcarriers.

According to the embodiment of FIG. 15 (*d*), HE-SIG-B of the non-legacy wireless LAN terminal carries information through the total primary band unlike the L-Part and the HE-SIG-A. However, according to the above embodiment, the wireless communication terminal transmits the HE-SIG-B after performing automatic gain control and channel estimation for the total bands by transmitting HT/VHT-STF/LTF in order to solve the disadvantage of FIG. 15(*c*). According to the above embodiment, it has an advantage of not wasting resources because HE-SIG-B information is transmitted using all the total bands. However, additional STF/LTF transmission is required.

The HE-SIG-B transmission method described in FIGS. 15 (*a*) to 15 (*d*) may be applied to the 40 MHz, 80 MHz and 160 MHz bands through a combination of at least one embodiment. Further, in the embodiments described below, when HE-SIG-B is not repeated, it means that one of the methods of FIG. 15 (*b*), (*c*) or (*d*) is used.

FIG. 16 illustrates various communication types in which MIMO and OFDMA are combined and a configuration of an HE-SIG-A/B field corresponding thereto. In FIG. 16, types A to D represent SISO/MIMO based downlink/uplink communications that does not use OFDMA. Also, in FIG. 16, types E to H represent SISO/MIMO based downlink/uplink communications using OFDMA.

Figure 17:
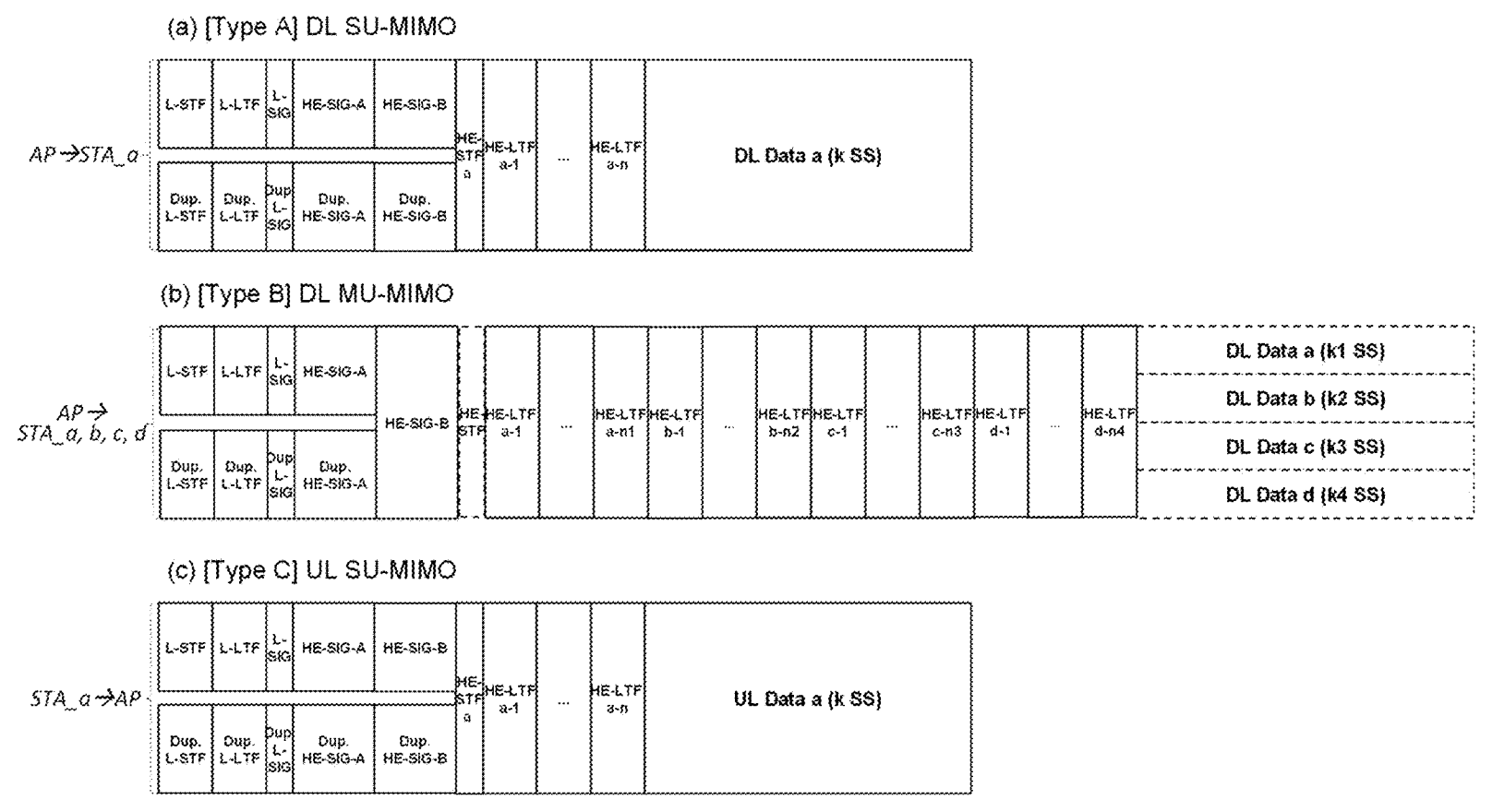

First, type A is a DL SU-SISO/SU-MIMO communication type, and a configuration example of a wireless LAN frame is illustrated in FIG. 17 (*a*). In the case of type A, OFDMA=0 and Uplink=0 are indicated in HE-SIG-A, and PAID[0] indicates one non-AP STA recipient (e.g., STA_a). GID[0] indicates 0 or 63, and NSTS indicates 1 for SISO and 2 to 8 for MIMO.

Type B is a DL MU-SISO/MU-MIMO communication type, and an example of the frame configuration is illustrated in FIG. 17 (*b*). In the case of type B, OFDMA=0 and Uplink=0 are indicated in HE-SIG-A. When the Group ID based HE-SIG-A format of FIG. 13 (*b*) is used, GID[0] and GID[1] respectively indicate Group IDs in which recipient non-AP STAs are included among values of 1 to 62. When the PAID-based HE-SIG-A format of FIG. 13 (*c*) is used, PAID[0] to PAID[7] indicate recipient non-AP STAs up to 8 (e.g., STA a to STA h). The recipient non-AP STAs indicated by the above two methods receive data in the total bands, and the number of the received wireless streams is determined by their NSTS[k]. NSTS[k] indicates a value of 1 for SISO and 1 to 4 for MIMO.

Type C is a UL SU-SISO/SU-MIMO communication type, and an example of the frame configuration is illustrated in FIG. 17 (*c*). In the case of C type, OFDMA=0 and Uplink=1 are indicated in HE-SIG-A, and PAID[0] indicates PAID of recipient AP. GID[0] indicates 0 or 63, and NSTS indicates 1 for SISO and 2 to 8 for MIMO.

Figure 18:
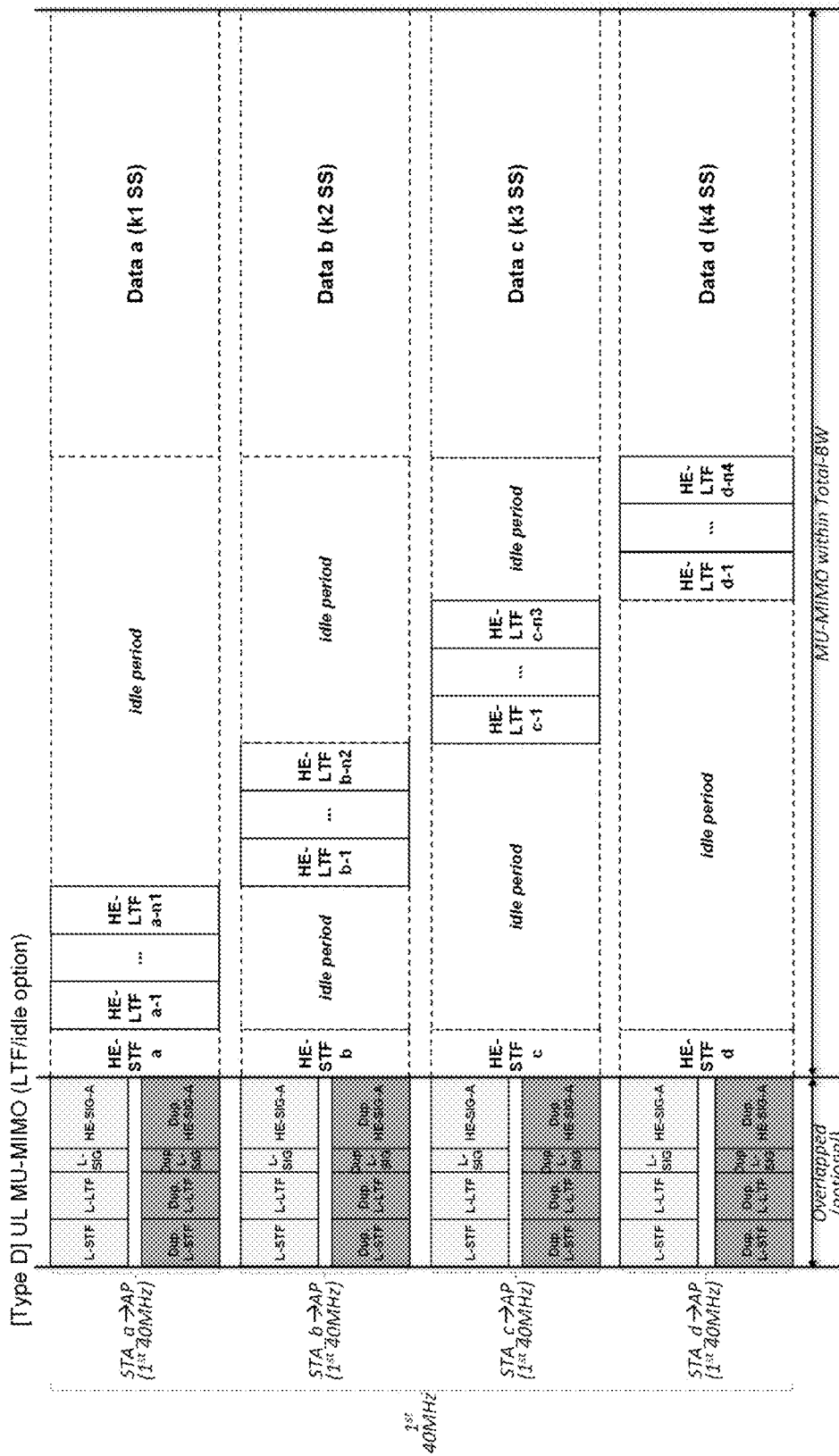
Figure 19:
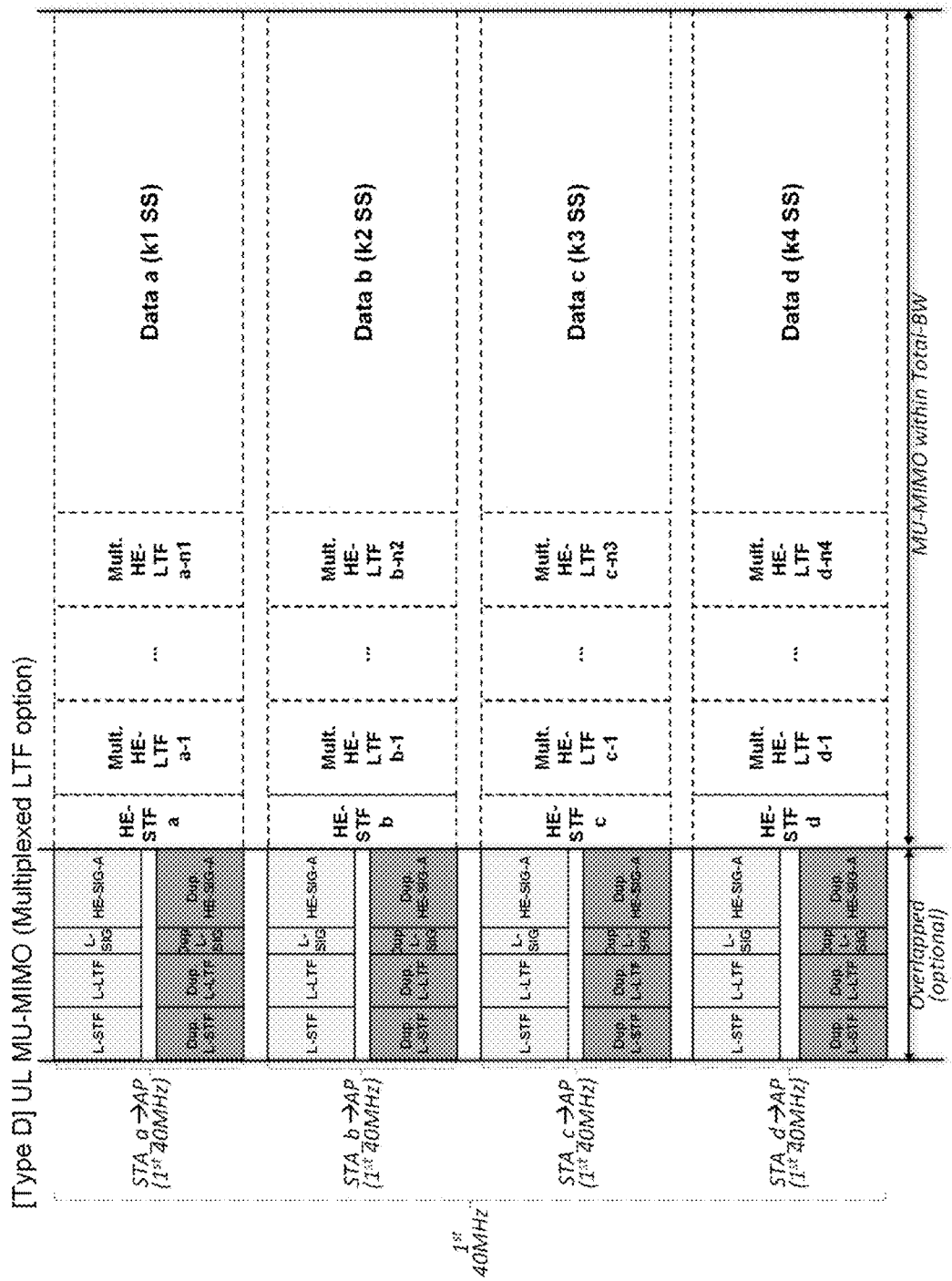

Type D is a UL MU-SISO/MU-MIMO communication type, and examples of the frame configuration are illustrated in FIGS. 18 and 19. In the case of type D, OFDMA=0 and Uplink=1 are indicated in HE-SIG-A. When the Group ID based HE-SIG-A format of FIG. 13 (*b*) is used, GID[0] and GID[1] respectively indicate Group IDs in which transmitter non-AP STAs are included among values of 1 to 62. When the PAID-based HE-SIG-A format of FIG. 13 (*c*) is used, PAID[0] to PAID[7] indicate transmitter non-AP STAs up to 8 (e.g., STA a to STA h). The transmitter non-AP STAs indicated by the above two methods transmit data in the total bands, and the number of the transmitted wireless streams is determined by their NSTS[k]. NSTS[k] indicates a value of 1 for SISO and 1 to 4 for MIMO.

Meanwhile, since OFDMA=0 in the type A to type D, the MUSB field may be ignored.

Figure 20:
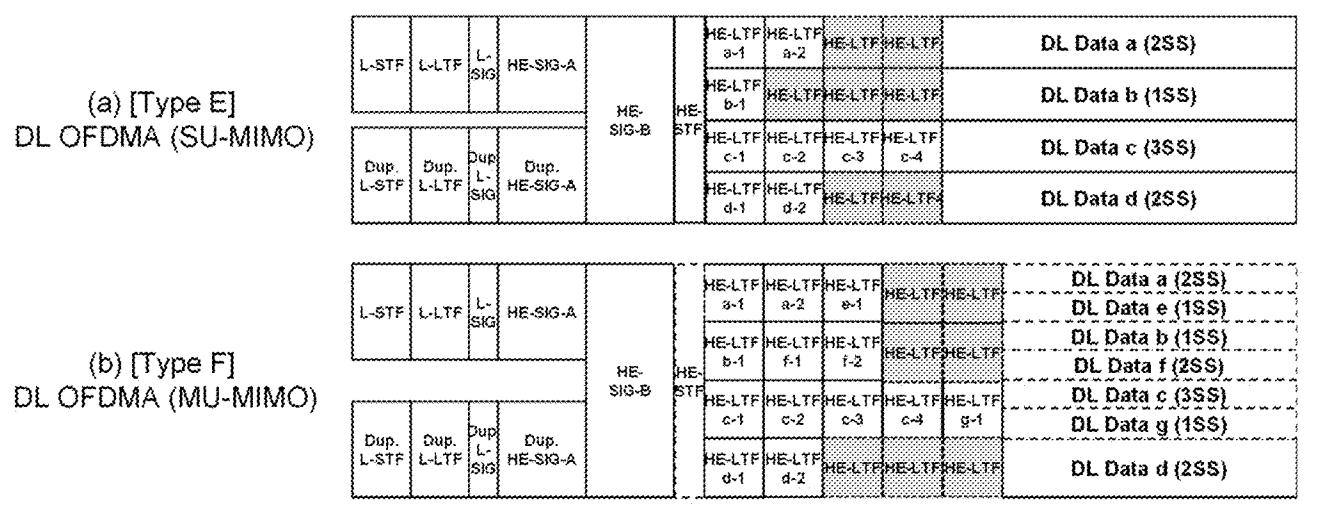

Type E is a DL OFDMA (SU-SISO/SU-MIMO) communication type, and an example of the frame configuration is illustrated in FIG. 20 (a). In the case of type E, OFDMA=1, Uplink=0, and MUSB=0 are indicated in HE-SIG-A. When the Group ID based HE-SIG-A format of FIG. 13 (b) is used, GID[0] and GID[1] respectively indicate Group IDs in which recipient non-AP STAs are included among values of 1 to 62. When the PAID-based HE-SIG-A format of FIG. 13 (c) is used, PAID[0] to PAID[7] indicate recipient non-AP STAs up to 8 (e.g., STA a to STA h). The recipient non-AP STAs indicated by the above two methods receive data solely within the allocated subband, and the number of the received wireless streams is determined by their NSTS[k]. NSTS[k] indicates a value of 1 for SISO and 1 to 4 for MIMO.

Type F is a DL OFDMA (MU-SISO/MU-MIMO) communication type, and an example of the frame configuration is illustrated in FIG. 20 (b). In the case of type F, OFDMA=1, Uplink=0, and MUSB=1 are indicated in HE-SIG-A. When the Group ID based HE-SIG-A format of FIG. 13 (b) is used, GID[0] and GID[1] respectively indicate Group IDs in which recipient non-AP STAs are included among values of 1 to 62. When the PAID-based HE-SIG-A format of FIG. 13 (c) is used, PAID[0] to PAID[7] indicate recipient non-AP STAs up to 8 (e.g., STA a to STA h). The recipient non-AP STAs indicated by the above two methods receive data solely or with a plurality of STAs within the allocated subband, and the number of the received wireless streams is determined by their NSTS[k]. NSTS[k] indicates a value of 1 for SISO and 1 to 4 for MIMO.

Figure 21:
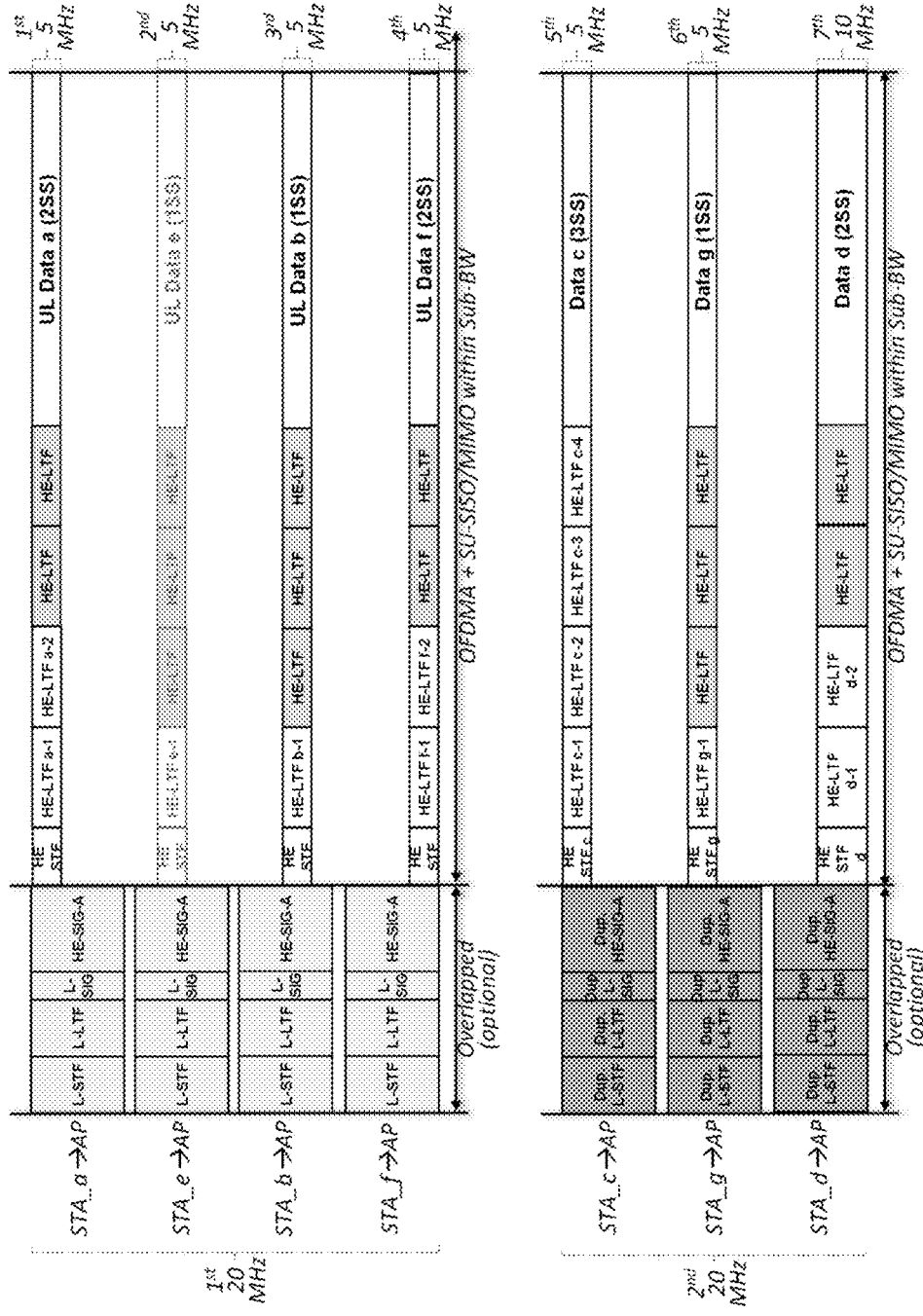

Type G is a UL OFDMA (SU-SISO/SU-MIMO) communication type, and an example of the frame configuration is illustrated in FIG. 21. In the case of type G, OFDMA=1, Uplink=1, and MUSB=0 are indicated in HE-SIG-A. When the Group ID based HE-SIG-A format of FIG. 13 (b) is used, GID[0] and GID[1] respectively indicate Group IDs in which transmitter non-AP STAs are included among values of 1 to 62. When the PAID-based HE-SIG-A format of FIG. 13 (c) is used, PAID[0] to PAID[7] indicate transmitter non-AP STAs up to 8 (e.g., STA a to STA h). The transmitter non-AP STAs indicated by the above two methods transmit data solely within the allocated subband, and the number of the transmitted wireless streams is determined by their NSTS[k]. NSTS[k] indicates a value of 1 for SISO and 1 to 4 for MIMO.

Figure 22:
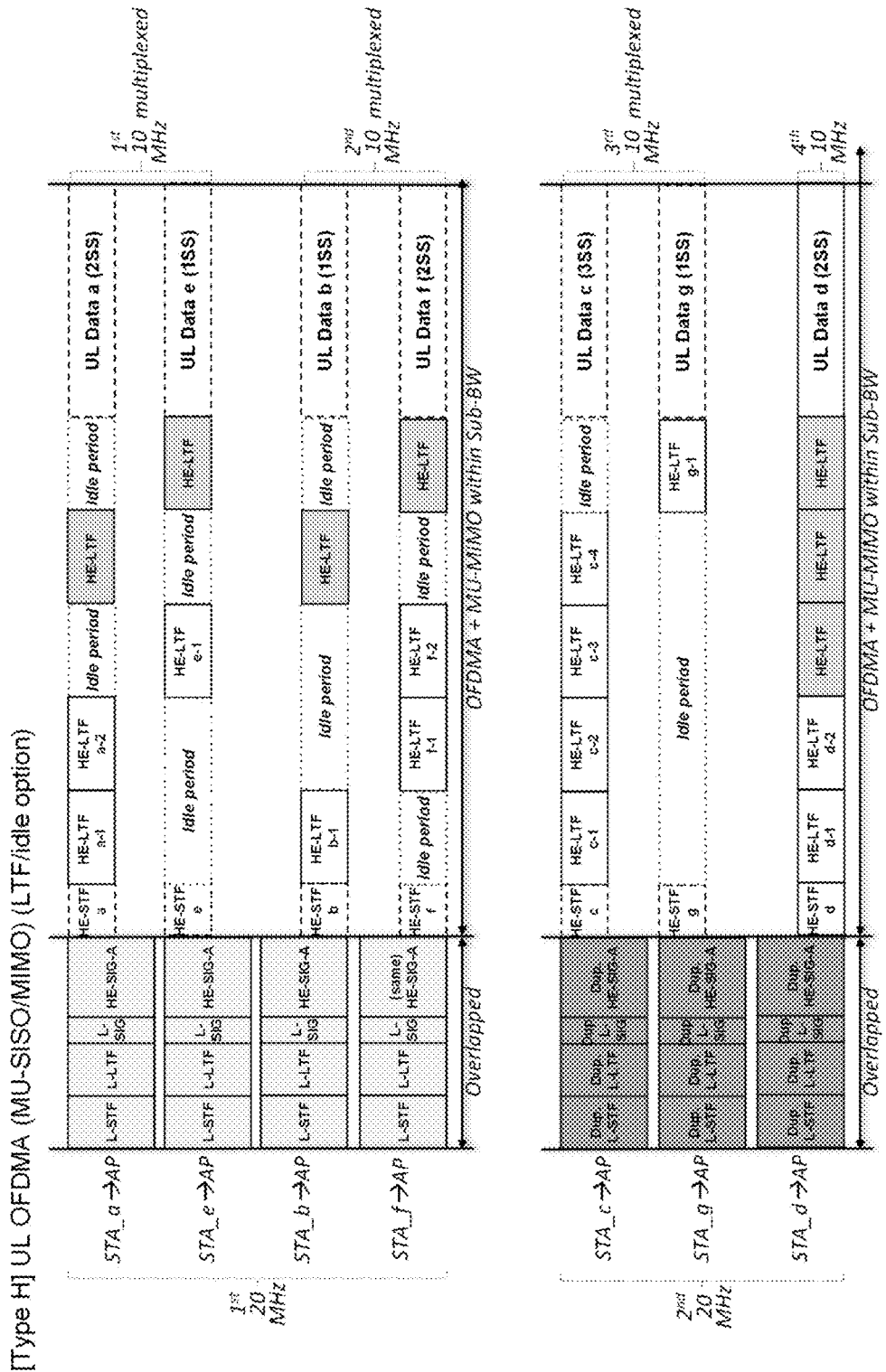
Figure 23:
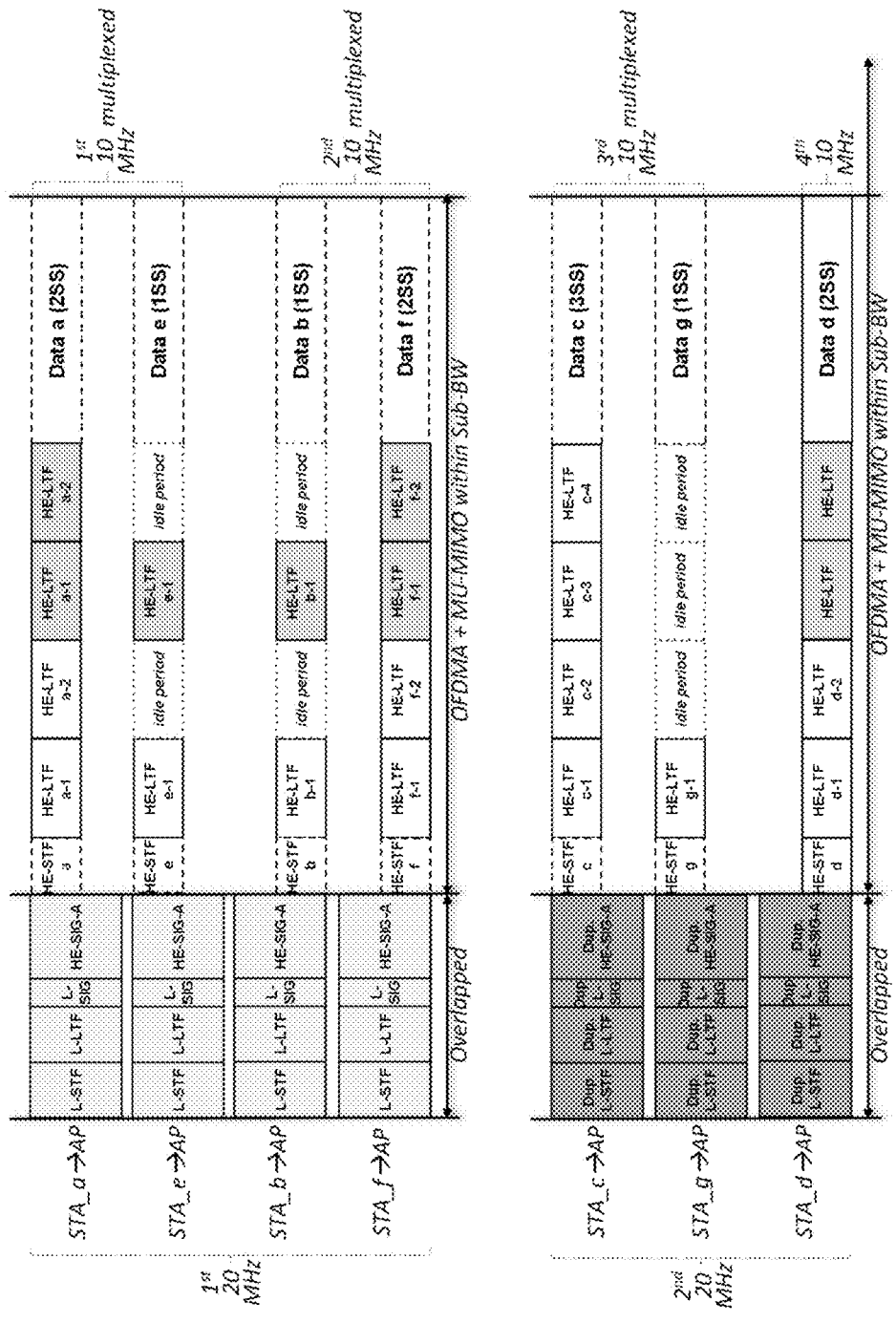

Type H is a UL OFDMA (MU-SISO/MU-MIMO) communication type, and examples of the frame configuration are illustrated in FIGS. 22 and 23. In the case of type H, OFDMA=1, Uplink=1, and MUSB=1 are indicated in HE-SIG-A. When the Group ID based HE-SIG-A format of FIG. 13 (b) is used, GID[0] and GID[1] respectively indicate Group IDs in which transmitter non-AP STAs are included among values of 1 to 62. When the PAID-based HE-SIG-A format of FIG. 13 (c) is used, PAID[0] to PAID[7] indicate transmitter non-AP STAs up to 8 (e.g., STA a to STA h). The transmitter non-AP STAs indicated by the above two methods transmit data solely or with a plurality of STAs within the allocated subband, and the number of the transmitted wireless streams is determined by their NSTS[k]. NSTS[k] indicates a value of 1 for SISO and 1 to 4 for MIMO.

FIGS. 17 to 23 illustrate configuration of the non-legacy wireless LAN frame according to the various communication types described in FIG. 16. That is, FIGS. 17 to 23 illustrate various configuration methods of OFDMA-based SISO/MIMO frame according to the configuration of the HE-SIG-A field in a total bandwidth of 40 MHz.

FIG. 17 (a) illustrates an embodiment of transmitting a DL SU-SISO/MIMO frame. In the embodiment of FIG. 17 (a), HE-SIG-A/B indicates a DL SU-SISO/MIMO frame that the total bandwidth is 40 MHz, OFMDA is not used, a single user frame in the total band, and NSTS[k]=1 to 8. In this case, the recipient STA_a of the corresponding frame receives the L-STF/L-LTF/L-SIG/HE-SIG-A fields through the primary 20 MHz channel of the BSS to which the corresponding terminal belongs. At the same time, the terminal duplicately receives the fields represented by the same value through secondary 20 MHz channels extended from the primary channel. STA_a may receive k ($1<=k<=8$) wireless streams indicated by NSTS values in a total bandwidth of 40 MHz indicated by HE-SIG-A. The number of HE-LTFs for this is calculated as n ($1<=k<=n<=8$).

FIG. 17 (b) illustrates an embodiment of transmitting a DL MU-SISO/MIMO frame. In the embodiment of FIG. 17 (b), HE-SIG-A/B indicates a DL SU-SISO/MIMO frame that the total bandwidth is 40 MHz, OFMDA is not used, a multi user frame in the total band, and NSTS[k]={k1, k1, k3, k4}. It this case, it is assumed that the recipients of the frame are {STA_a, STA_b, STA_c, STA_d}. In this case, the recipients {STA_a, STA_b, STA_c, STA_d} of the corresponding frame receive the L-STF/L-LTF/L-SIG/HE-SIG-A fields transmitted by the AP through the primary 20 MHz channel of the BSS to which the corresponding terminals belong. At the same time, the terminals duplicately receive the fields represented by the same value through extended secondary 20 MHz channels. If the value 0 does not exists among the values of NSTS[0], . . . , and NSTS[3] of the received frame, all the data having the four STAs as the recipient exist in the corresponding frame. The four STAs may receive k1, k2, k3 and k4 wireless streams calculated by NSTS[k] in a total bandwidth of 40 MHz indicated by the BW field, respectively. To this end, the number of HE-LTFs for each subband is calculated as n1, n2, n3 and n4.

FIG. 17 (c) illustrates an embodiment of transmitting a UL SU-SISO/MIMO frame. In the embodiment of FIG. 17 (c), HE-SIG-A/B indicates a UL SU-SISO/MIMO frame that the total bandwidth is 40 MHz, OFMDA is not used, a single user frame in the total band, and NSTS[k]=1 to 8. In this case, the recipient AP of the corresponding frame receives the L-STF/L-LTF/L-SIG/HE-SIG-A fields transmitted from STA_a through the primary 20 MHz channel of the AP's BSS. At the same time, the AP duplicately receives the fields represented by the same value through extended secondary 20 MHz channels. AP may receive k ($1<=k<=8$) wireless streams indicated by NSTS values in a total bandwidth of 40 MHz indicated by the BW field. The number of HE-LTFs for this is calculated as n ($1<=k<=n<=8$).

FIG. 18 illustrates an embodiment of transmitting a UL MU-SISO/MIMO frame. In the embodiment of FIG. 18, HE-SIG-A/B indicates a UL MU-SISO/MIMO frame that the total bandwidth is 40 MHz, OFMDA is not used, a multi user frame in the total bands, and NSTS[k]={k1, k1, k3, k4}. It this case, the transmitters are {STA_a, STA_b, STA_c, STA_d} and the recipient is AP. The AP duplicately receives the L-STF/L-LTF/L-SIG/HE-SIG-A fields transmitted from {STA_a, STA_b, STA_c, STA_d} through the primary 20 MHz channel and the secondary 20 MHz channels of the AP's BSS. The information inserted in the corresponding field is information shared between {STA_a, STA_b, STA_c, STA_d} through communication with the AP before starting the UL communication.

If the value 0 does not exists among the values of NSTS[0], . . . , and NSTS[3] of the received frame, all the data having the four STAs as the recipient exist in the corresponding frame. The four STAs may receive k1, k2, k3 and k4 wireless streams calculated by NSTS[k] in a total bandwidth of 40 MHz indicated by the BW field, respectively. To this end, the number of HE-LTFs for each subband is calculated as n1, n2, n3 and n4.

While each STA transmits the LTF(s), other STAs maintain an idle period as many as the corresponding number of LTF(s) so that the AP can successfully receive the LTF(s) from a particular STA. In this case, the STAs may defer the data transmission in the corresponding idle period or transmit a signal that does not affect the LTF transmission of another STA.

According to an embodiment, the STAs may transmit HE-STF first, without transmitting information of the L-Part and HE-SIG-A which are previously shared. However, if the HE-STF encoded in the MIMO format is directly transmitted without transmitting the L-Part and the HE-SIG-A, the reception performance may decrease at the AP side.

FIG. 19 illustrates another embodiment of transmitting a UL MU-SISO/MIMO frame. In the embodiment of FIG. 19, the same or corresponding parts as those of the embodiment of FIG. 18 will be omitted.

According to the embodiment of FIG. 19, various methods that a plurality of STAs simultaneously transmit HE-LTFs may be used. According to an embodiment, a plurality of STAs may simultaneously transmit HE-LTFs by dividing subcarriers in a frequency axis. According to another embodiment, the HE-LTFs of a plurality of STAs may be transmitted by multiplexing in the form of a random sequence.

FIG. 20 illustrates an embodiment of transmitting a DL OFDMA SU/MU-MIMO frame. More specifically, FIG. 20 (a) illustrates an embodiment of transmitting a DL OFDMA SU-MIMO frame, and FIG. 20 (b) illustrates an embodiment of a transmitting a DL OFDMA MU-MIMO frame.

In the embodiment of FIG. 20 (a), HE-SIG-A/B indicates a DL OFDMA (SU-MIMO) frame that the total bandwidth is 40 MHz, OFMDA is used, a multi user frame in the total bands, a single user frame in the individual subband, and NSTS[k]={2, 1, 3, 2}. It this case, the transmitter is AP and the recipients are {STA_a, STA_b, STA_c, STA_d}. The {STA_a, STA_b, STA_c, STA_d} duplicately receive the L-STF/L-LTF/L-SIG/HE-SIG-A fields transmitted from AP through the primary 20 MHz channel and the secondary 20 MHz channels of the BSS to which the corresponding terminals belong.

Since the value 0 does not exists among the values of NSTS[0], . . . , and NSTS[3] of the received frame, all the data having the four STAs as the recipient exist in the corresponding frame. The STAs may receive 2, 1, 3 and 2 wireless streams calculated by NSTS[k] in a total bandwidth of 40 MHz indicated by the BW field, respectively. To this end, the number of HE-LTFs for each subband is calculated as 2, 1, 4 and 2.

In the embodiment of FIG. 20 (b), HE-SIG-A/B indicates a DL OFDMA (MU-MIMO) frame that the total bandwidth is 40 MHz, OFMDA is used, a multi user frame in the total bands, a multi user (i.e., MUSB=1) frame in the individual subband, and NSTS[k]={2, 1, 1, 2, 3, 1, 2}. It this case, the transmitter is AP and the recipients are {STA_a, STA_e, STA_b, STA_f, STA_c, STA_g, STA_d}. The {STA_a, STA_e, STA_b, STA_f, STA_c, STA_g, STA_d} duplicately receive the L-STF/L-LTF/L-SIG/HE-SIG-A fields transmitted from AP through the primary 20 MHz channel and the secondary 20 MHz channels of the BSS to which the corresponding terminals belong. The STAs may receive 2, 1, 1, 2, 3, 1 and 2 wireless streams calculated by NSTS[k] in a total bandwidth of 40 MHz indicated by the BW field, respectively. To this end, the number of HE-LTFs for each subband is calculated as 2, 1, 1, 2, 4, 1 and 2.

In the embodiments of FIGS. 20 (a) and 20 (b), due to the difference in total number of LTFs for each subband and the difference in GI length between the STF/LTF/SIG interval and the data interval, the interval alignment between symbols may not be correct in terms of overall bandwidth. For example, referring to FIG. 17 (c) and FIG. 17 (d), individual 10 MHz subbands obtained by dividing the total bandwidth 40 MHz by 4 are allocated to {STA_a, STA_e}, {STA_b, STA_f}, {STA_c, STA_g} and {STA_d}, respectively. In this case, in the first, second and third subbands, one wireless stream is transmitted in the form of MU-SISO for each of two STAs, that is, a total of two wireless streams are transmitted. On the other hand, in the fourth subband, only one STA transmits a total of one wireless stream in the form of SU-SISO, which may result in inaccurate interval alignment between symbols in terms of the total bandwidth.

As a method for solving this problem, the AP may keep the number of HE-LTFs transmitted to each STA the same or use an aggregated HE-LTF. That is, the AP may transmit the same number of HE-LTFs through each subband during an OFDMA communication. In this case, each STA receiving OFDMA data from the AP receives the same number of HE-LTFs. In this case, the number of HE-LTFs may indicate the number of OFDM symbols including HE-LTF. According to an embodiment of the present invention, the AP may transmit the HE-LTFs based on the sub-frequency band in which the largest number of wireless streams are transmitted among the plurality of subbands. For example, the AP may transmit the corresponding number of HE-LTFs through all subbands based on the number of HE-LTFs required in the subband in which the largest number of wireless streams are transmitted. To transmit the same number of HE-LTFs for each subband, the AP may transmit repeated HE-LTFs on a specific subband.

FIG. 21 illustrates an embodiment of transmitting a UL OFDMA SU-SISO/MIMO frame. In the embodiment of FIG. 21, HE-SIG-A/B indicates a UL OFDMA (SU-SISO/MIMO) frame that the total bandwidth is 40 MHz, OFMDA is used, a multi user frame in the total bands, a single user (i.e., MUSB=0) frame in the individual subband, and NSTS[k]={2, 1, 1, 2, 3, 1, 2}. It this case, the transmitters are {STA_a, STA_e, STA_b, STA_f, STA_c, STA_g, STA_d} and the recipient is AP. The AP duplicately receives the L-STF/L-LTF/L-SIG/HE-SIG-A fields transmitted from {STA_a, STA_e, STA_b, STA_f, STA_c, STA_g, STA_d} through the primary 20 MHz channel and the secondary 20 MHz channels of the AP's BSS. The AP may receive 2, 1, 1, 2, 3, 1 and 2 wireless streams indicated by NSTS[k] in a total bandwidth of 40 MHz indicated by the BW field, respectively. To this end, the number of HE-LTFs for each subband is calculated as 2, 1, 1, 2, 4, 1 and 2.

In this, case, due to the difference in total number of LTFs for each subband and the difference in GI length between the STF/LTF/SIG interval and the data interval, the interval alignment between symbols may not be correct in terms of overall bandwidth. For example, referring to FIG. 21, individual 5 MHz and 10 MHz subbands obtained by dividing the total bandwidth 40 MHz by 7 are allocated to {STA_a, STA_e, STA_b, STA_f, STA_c, STA_g, STA_d, respectively. In this case, SIG-B, LTF, data, and the like are transmitted at the same time in each subband, and the interval alignment between symbols may not be correct in terms of overall bandwidth. As a method for solving this problem, each STA may keep the number of HE-LTFs transmitted to the AP the same or use an aggregated HE-LTF.

FIG. 22 illustrates an embodiment of transmitting a UL OFDMA MU-SISO/MIMO frame. In the embodiment of FIG. 22, HE-SIG-A/B indicates a UL OFDMA (MU-SISO/MIMO) frame that the total bandwidth is 40 MHz, OFMDA is used, a multi user frame in the total bands, a mingle user (i.e., MUSB=1) frame in the individual subband, and NSTS [k]={2, 1, 1, 2, 3, 1, 2}. It this case, the transmitters are {STA_a, STA_e, STA_b, STA_f, STA_c, STA_g, STA_d} and the recipient is AP. The AP duplicately receives the L-STF/L-LTF/L-SIG/HE-SIG-A fields transmitted from {STA_a}, {STA_e}, {STA_b}, {STA_f}, {STA_c}, {STA_g} and {STA_d} through the primary 20 MHz channel and the secondary 20 MHz channels of the AP's BSS. The AP may receive 2, 1, 1, 2, 3, 1 and 2 wireless streams indicated by NSTS[k] in a total bandwidth of 40 MHz indicated by the BW field, respectively. To this end, the number of HE-LTFs for each subband is calculated as 2, 1, 1, 2, 4, 1 and 2.

In this, case, due to the difference in total number of LTFs for each subband and the difference in GI length between the STF/LTF/SIG interval and the data interval, the interval alignment between symbols may not be correct in terms of overall bandwidth. For example, referring to FIG. 22, individual 10 MHz subbands obtained by dividing the total bandwidth 40 MHz by 4 are allocated to {STA_a, STA_e}, {STA_b, STA_f}, {STA_c, STA_g} and {STA_d}, respectively. In this case, SIG-B, LTF, data, and the like are transmitted at the same time in each subband, and the interval alignment between symbols may not be correct in terms of overall bandwidth. As a method for solving this problem, each STA may keep the number of HE-LTFs transmitted to the AP the same or use an aggregated HE-LTF.

While each STA transmits the LTF(s) within the subband, other STAs maintain an idle period as many as the corresponding number of LTF(s) so that the AP can successfully receive the LTF(s) from a particular STA. In this case, the STAs may defer the data transmission in the corresponding idle period or transmit a signal that does not affect the LTF transmission of another STA.

FIG. 23 illustrates another embodiment of transmitting a UL OFDMA MU-SISO/MIMO frame. In the embodiment of FIG. 23, the same or corresponding parts as those of the embodiment of FIG. 22 will be omitted.

According to the embodiment of FIG. 23, various methods that a plurality of STAs simultaneously transmit HE-LTFs may be used. According to an embodiment, a plurality of STAs may simultaneously transmit HE-LTFs by dividing subcarriers in a frequency axis. According to another embodiment, the HE-LTFs of a plurality of STAs may be transmitted by multiplexing in the form of a random sequence.

Figure 24:
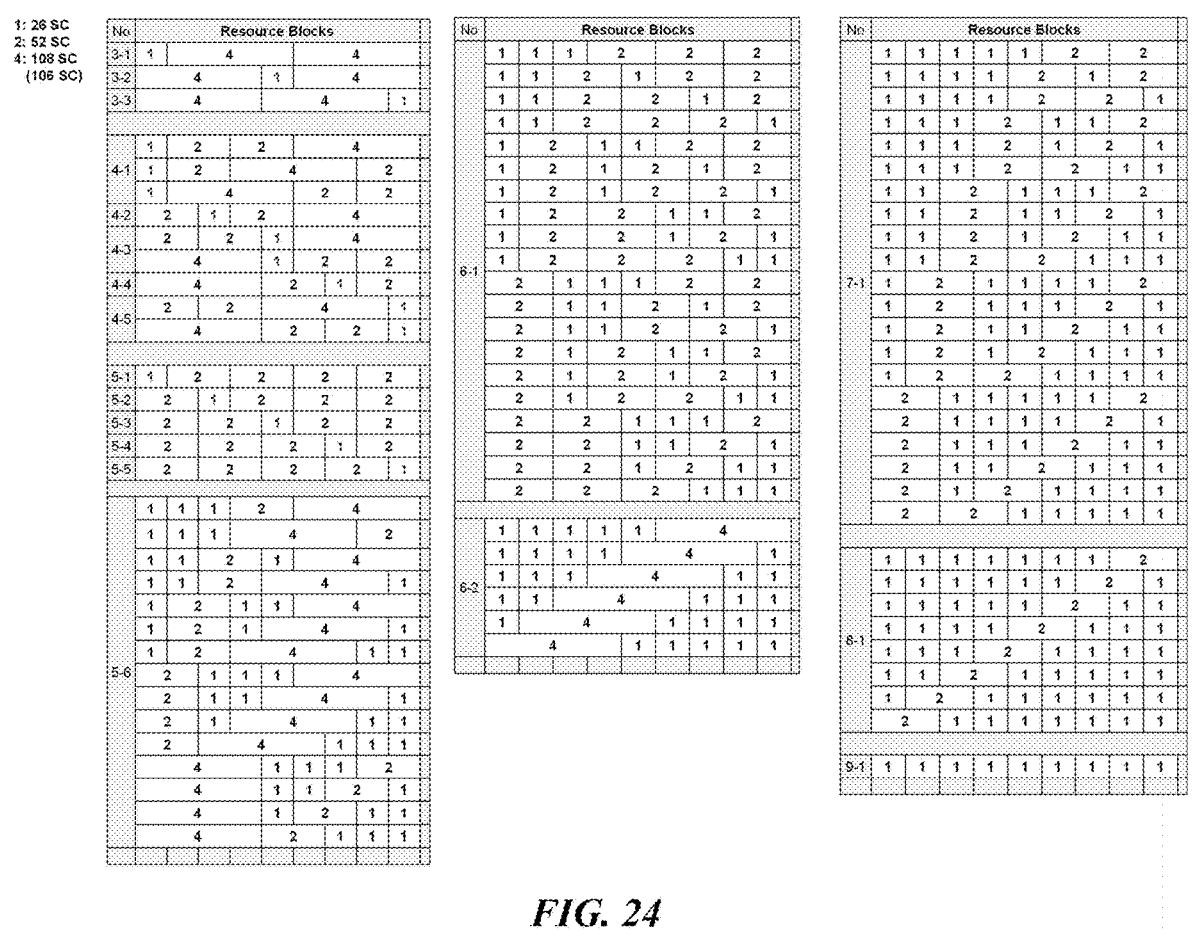

FIG. 24 illustrates an embodiment in which a 20 MHz frequency band is divided into at least one subband to allocate a resource unit.

The 20 MHz frequency band through which the non-legacy wireless LAN frame is transmitted may be configured with 256 subcarriers through 256 FFTs. The 256 subcarriers may be composed of 11 guard band subcarriers, 3 DC subcarriers, and 242 data subcarriers.

According to an embodiment of the present invention, the 20 MHz frequency band may be composed of at least one subband. When the frequency band is divided into a plurality of subbands, the frequency band is composed of a plurality of resource units. According to an embodiment of the present invention, when the frequency band is divided into a plurality of subbands, the frequency band may be divided into a combination of at least one of three resource units having different sizes.

First, the first resource unit has a size based on a value obtained by dividing a 20 MHz frequency band composed of 242 data subcarriers into 9. According to an embodiment, the first resource unit may be composed of 26 data subcarriers. The second resource unit has a size based on twice the size of the first resource unit. According to an embodiment, the second resource unit may be composed of 52 data subcarriers.

The third resource unit has a size based on four times the size of the first resource unit. According to an embodiment, the third resource unit may be composed of 108 subcarriers. According to another embodiment, the third resource unit may be composed of 106 subcarriers. The number of data subcarriers constituting the third resource unit may not be equal to four times the number of data subcarriers of the first resource unit depending on the number of guard band subcarriers and/or DC subcarriers.

According to the embodiment of the present invention, when the 20 MHz frequency band is divided into a plurality of subbands, the frequency band may be composed of 3 to 9 resource units as shown in FIG. 24. In the following description, the frequency band may represent a basic band of 20 MHz.

When the frequency band is divided into 3 subbands, the frequency band is divided into 1 first resource unit and 2 third resource units (3-1 to 3-3).

When the frequency band is divided into 4 subbands, the frequency band is divided into 1 first resource unit, 2 second resource units, and 1 third resource unit (4-1 to 4-5).

When the frequency band is divided into 5 subbands, there are a plurality of division methods. According to an embodiment, the frequency band is divided into 1 first resource unit and 4 second resource units (5-1 through 5-5). According to another embodiment, the frequency band is divided into 3 first resource units, 1 second resource unit, and 1 third resource unit (5-6).

When the frequency band is divided into 6 subbands, there are a plurality of division methods. According to an embodiment, the frequency band is divided into 4 first resource units and 2 second resource units (6-1). According to another embodiment, the frequency band is divided into 5 first resource units and 1 third resource unit (6-2).

When the frequency band is divided into 7 subbands, the frequency band is divided into 5 first resource units and 2 second resource units (7-1).

When the frequency band is divided into 8 subbands, the frequency band is divided into 7 first resource units and 1 second resource unit (8-1).

When the frequency band is divided into 9 subbands, the frequency band is divided into 9 first resource units (9-1).

As described above, according to the embodiment of the present invention, the frequency band may be divided into a plurality of subbands through a combination of at least one of the first resource unit, the second resource unit, and the third resource unit. The arrangement information of the resource units in the frequency band may be carried by the resource allocation (e.g., RA-B) field of the HE-SIG-B of the non-legacy wireless LAN frame as described above. The identifier information of the STAs to which each resource unit is allocated is sequentially determined based on the AID or PAID information indicated in HE-SIG-B.

Figure 25:
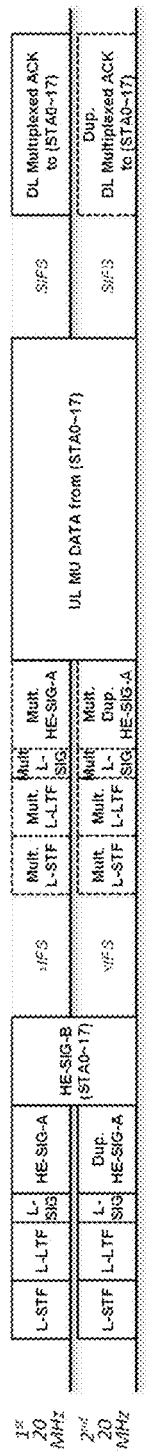
FIG. 25 illustrates a configuration of a null data packet (NDP) trigger frame according to an embodiment of the present invention.

FIG. 25 illustrates a configuration of a null data packet (NDP) trigger frame according to an embodiment of the present invention.

The transmission of UL MU frame is indicated by a trigger frame. According to an embodiment, the trigger frame may follow the NDP format. The NDP format carries only the PHY preamble without MAC packets. The AP may transmit the HE-SIG-A and the HE-SIG-B through the NDP trigger frame, and the common control information and the user fields of the STAs to perform the uplink transmission are included in the field. As described above with reference to FIG. 14, the common control information may include the resource allocation field, and the user field may include identifier information and number of streams information of at least one STA allocated to each resource unit.

The L-SIG and HE-SIG-A of the UL frames transmitted by the STAs may be duplicated with the values of L-SIG and HE-SIG-A transmitted by the AP. However, the UL frames may not include HE-SIG-B.

The length field of the L-SIG of the trigger frame may be set to a value including the length up to UL data+DL Multi-ACK as well as the length of the trigger frame. In addition, the length field of the L-SIG of the UL frame (UL MU PPDU) may be set to a value including the length up to DL Multi-ACK as well as the length of the UL MU PPDU. This is because the length may be very long if the DL Multi-ACK includes ACK information for multiple STAs, and a collision may occur by accessing the channel after an EIFS time if the existing legacy terminal is a hidden node from the AP.

After the trigger frame is transmitted, each STA may perform the CCA for a predetermined IFS (xIFS) in the allocated channel, and suspend the transmission when the channel is busy. This is to avoid a situation where a collision with other STAs already transmitting on the corresponding channel may occur even if the AP indicates the UL transmission through the trigger frame. According to an embodiment, the DL Multi-ACK may be repeatedly transmitted through the secondary channels as well as the primary channel.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A station (STA) comprising:
a transceiver; and
a processor,
wherein the processor is configured to:
receive a preamble of a PPDU (Physical layer Protocol Data Unit) from an access point (AP),
wherein the preamble includes a High Efficiency Signal A (HE-SIG-A) field and an High Efficiency Signal B (HE-SIG-B) field, and
wherein whether the HE-SIG-B field includes or does not include a resource allocation field indicating information of one or more resource units in a frequency band in which the PPDU is transmitted is identified based on whether an OFDMA (Orthogonal Frequency Division Multiple Access) is applied, when the PPDU is transmitted via MU (multi-user) transmission, and
receive a data of the PPDU from the AP.

2. The STA of claim 1,
wherein the HE-SIG-B field does not include the resource allocation field, when the OFDMA is not applied.

3. The STA of claim 1,
wherein the HE-SIG-B field includes the resource allocation field, when the OFDMA is applied.

4. The STA of claim 1,
wherein the HE-SIG-A field includes a predetermined field indicating whether the OFDMA is not applied when the PPDU is transmitted through the MU transmission.

5. The STA of claim 1,
wherein the HE-SIG-A field includes a bandwidth field indicating a total bandwidth in which the frame is transmitted.

6. The STA of claim 1,
wherein the HE-SIG-B field further includes one or more user fields indicating information of one or more terminals allocated to each resource unit constituting the frequency band.

7. The STA of claim 6,
wherein the user fields sequentially indicate information of the terminals allocated to each resource unit constituting the frequency band.

8. The STA of claim 6,
wherein the information of one or more resource units includes information on each size of the resource units and an arrangement of the resource units in the frequency band.

9. The STA of claim 6,
wherein the user field includes identifier information of a terminal allocated to one of the resource units and number of streams information.

10. The STA of claim 1,
wherein when the frequency band is divided into a plurality of subbands, the frequency band includes a combination of at least one of a first resource unit having a basic size, a second resource unit having a size based on twice the basic size, and a third resource unit having a size based on four times the basic size.

11. A wireless communication method of a station (STA), the method comprising:
receiving a preamble of a PPDU from an access point (AP),
wherein the preamble includes a High Efficiency Signal A (HE-SIG-A) field and an High Efficiency Signal B (HE-SIG-B) field, and
wherein whether the HE-SIG-B field includes or does not include a resource allocation field indicating information of one or more resource units in a frequency band in which the PPDU is transmitted is identified based on whether an OFDMA (Orthogonal Frequency Division Multiple Access) is applied, when the PPDU is transmitted via MU (multi-user) transmission; and
receiving a data of the frame from the AP.

12. The wireless communication method of claim 11,
wherein the HE-SIG-B field does not include the resource allocation field when the OFDMA is not applied.

13. The wireless communication method of claim 11,
wherein the HE-SIG-B field includes the resource allocation field when the OFDMA is applied.

14. The wireless communication method of claim 11,
wherein the HE-SIG-A field includes a predetermined field indicating whether the OFDMA is not applied when the PPDU is transmitted through the MU transmission.

15. The wireless communication method of claim 11,
wherein the HE-SIG-A field includes a bandwidth field indicating a total bandwidth in which the frame is transmitted.

16. The wireless communication method of claim 11,
wherein the HE-SIG-B field further includes one or more user fields indicating information of one or more terminals allocated to each resource unit constituting the frequency band.

17. The wireless communication method of claim 16,
wherein the user fields sequentially indicate information of the terminals allocated to each resource unit constituting the frequency band.

18. The wireless communication method of claim 16,
wherein the information of one or more resource units includes information on each size of the resource units and an arrangement of the resource units in the frequency band.

19. The wireless communication method of claim 16,
wherein the user field includes identifier information of a terminal allocated to one of the resource units and number of streams information.

20. The wireless communication method of claim 11,
wherein when the frequency band is divided into a plurality of subbands, the frequency band includes a combination of at least one of a first resource unit having a basic size, a second resource unit having a size based on twice the basic size, and a third resource unit having a size based on four times the basic size.

\* \* \* \* \*